US007951025B2

(12) United States Patent
Mitsubori et al.

(10) Patent No.: US 7,951,025 B2
(45) Date of Patent: May 31, 2011

(54) POWER UNIT FOR MOTORCYCLE

(75) Inventors: Toshimasa Mitsubori, Saitama (JP); Erika Hara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 12/107,212

(22) Filed: Apr. 22, 2008

(65) Prior Publication Data

US 2008/0268992 A1 Oct. 30, 2008

(30) Foreign Application Priority Data

Apr. 25, 2007 (JP) ................................ 2007-115802

(51) Int. Cl.
*F16H 59/00* (2006.01)

(52) U.S. Cl. ................................ 474/28; 474/43; 474/16

(58) Field of Classification Search .................. 474/1–3, 474/8, 11, 12, 13, 17, 18, 28, 39, 43, 45, 474/69, 70
See application file for complete search history.

(56) References Cited

U.S. PATENT DOCUMENTS

| | | | | |
|---|---|---|---|---|
| 4,907,471 | A | 3/1990 | Ishimaru | |
| 5,176,579 | A | 1/1993 | Ohsono et al. | |
| 6,945,906 | B2 * | 9/2005 | Eguchi et al. | 477/45 |
| 2004/0209732 | A1 * | 10/2004 | Eguchi et al. | 477/44 |
| 2005/0107195 | A1 * | 5/2005 | Katou | 474/28 |

FOREIGN PATENT DOCUMENTS

| | | | |
|---|---|---|---|
| DE | 38 72 035 | T2 | 12/1992 |
| DE | 69120498 | T2 | 10/1996 |
| DE | 19920063 | C1 | 1/2001 |
| EP | 0 288 080 | A1 | 10/1988 |
| JP | 58-102828 | A | 6/1983 |
| JP | 63-047560 | | 2/1988 |
| JP | 2000-179659 | | 6/2000 |

* cited by examiner

*Primary Examiner* — Emmanuel M Marcelo
(74) *Attorney, Agent, or Firm* — Birch, Stewart, Kolasch & Birch, LLP

(57) ABSTRACT

A motorcycle including a power transmission device including a continuously variable transmission having a belt wound around a drive pulley and around a driven pulley and a hydraulically-operated clutch provided on at least one of a drive pulley shaft and a driven pulley shaft and an internal combustion engine wherein a supply of working oil to the clutch and of lubricating oil to a continuously variable transmission is enabled while avoiding a complication of an oil passage configuration and an increase in the diameter of the pulley shaft. A clutch control oil passage directs working oil to a clutch and a lubricating oil passage directs lubricating oil to a continuously variable transmission are provided in the particular pulley shaft on which the clutch is provided, so as to be coaxial with each other and be axially isolated from each other.

20 Claims, 14 Drawing Sheets

POWER UNIT FOR MOTORCYCLE

CROSS-REFERENCE TO RELATED APPLICATIONS

The present application claims priority under 35 USC 119 to Japanese Patent Application No. 2007-115802 filed on Apr. 25, 2007 the entire contents of which are hereby incorporated by reference.

BACKGROUND OF THE INVENTION

1. Field of the Invention

The present invention relates to a power unit for a motorcycle including an internal combustion engine and a power transmission device that includes a continuously variable transmission and a hydraulically-operated clutch. The transmission includes a drive pulley provided on a drive pulley shaft adapted to receive rotational power transmitted from the engine, a driven pulley provided on a driven pulley shaft having an axis parallel to the drive pulley shaft and a belt wound around the drive pulley and around the driven pulley. The clutch is provided on at least one of the drive pulley shaft and the driven pulley shaft.

2. Description of Background Art

A power unit for a motorcycle is disclosed in Japanese Patent Laid-Open No. Sho 58-102828 wherein a start clutch for switching disengagement and engagement between a drive pulley shaft and a driven pulley shaft is provided on the drive pulley shaft of a continuously variable transmission.

In the power unit disclosed in Japanese Patent Laid-Open No. Sho 58-102828, a clutch control oil passage is adapted to direct working oil to the start clutch on the central side of the drive pulley shaft. A lubricating oil passage is provided that is adapted to lead lubricating oil toward the drive pulley on the drive pulley shaft so as to coaxially surround the clutch control oil passage. However, such a structure not only complicates the oil passage configuration but also needs to set the outside diameter of the drive pulley shaft to a relatively large size in order to ensure the rigidity of the drive pulley.

SUMMARY AND OBJECTS OF THE INVENTION

The present invention has been made in view of such circumferences and it is an object of an embodiment of the present invention to provide a power unit for a motorcycle that enables a supply of working oil to a clutch and a supply of lubricating oil to a continuously variable transmission while avoiding complications relating to the oil passage configuration and an increase in the diameter of a pulley shaft.

According to embodiment of the present invention, a power unit for a motorcycle includes an internal combustion engine and a power transmission device including a continuously variable transmission having a drive pulley provided on a drive pulley shaft adapted to receive rotational power transmitted thereto from the engine, a driven pulley provided on a driven pulley shaft having an axis parallel to the drive pulley shaft and a belt wound around the drive pulley and around the driven pulley. A hydraulically-operated clutch is provided on at least one of the drive pulley shaft and the driven pulley shaft. A clutch control oil passage adapted to lead working oil to the clutch and a lubricating oil passage adapted to lead lubricating oil to the continuously variable transmission are provided in the particular pulley shaft on which the clutch is provided, so as to be coaxial with each other and be axially isolated from each other.

According to embodiment of the present invention, a branch oil passage branching from the lubricating oil passage and extending laterally of the clutch control oil passage is provided in the particular pulley shaft to lead lubricating oil to a canceller chamber of the clutch.

In addition, the driven pulley shaft 96 of the embodiment corresponds to the particular pulley shaft of an embodiment of the present invention and the start clutch 93 of the embodiment corresponds to the clutch of an embodiment of the invention.

According to embodiment of the present invention, since the clutch control oil passage adapted to lead working oil to the clutch and the lubricating oil passage adapted to lead lubricating oil to the continuously variable transmission are provided in the particular pulley shaft on which the clutch is provided, so as to be coaxial with each other and be axially isolated from each other, the complication of the oil passage configuration can be suppressed. In addition, an increase in the diameter of the particular pulley shaft can be avoided.

According to embodiment of the present invention, lubricating oil can be led to the canceller chamber of the clutch by use of the branch oil passage branching from the lubricating oil passage and extending laterally of the clutch control oil passage. Therefore, the lubricating oil led from the lubricating oil passage axially isolated from the clutch control oil passage can be led toward the canceller chamber of the clutch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the accompanying drawings.

FIGS. 1 to 14 illustrate an embodiment of the present invention. It is to be noted that the front and rear and the left and right in the embodiment refer to respective directions in the state where the motorcycle faces the front of the traveling direction thereof.

Figure 1:
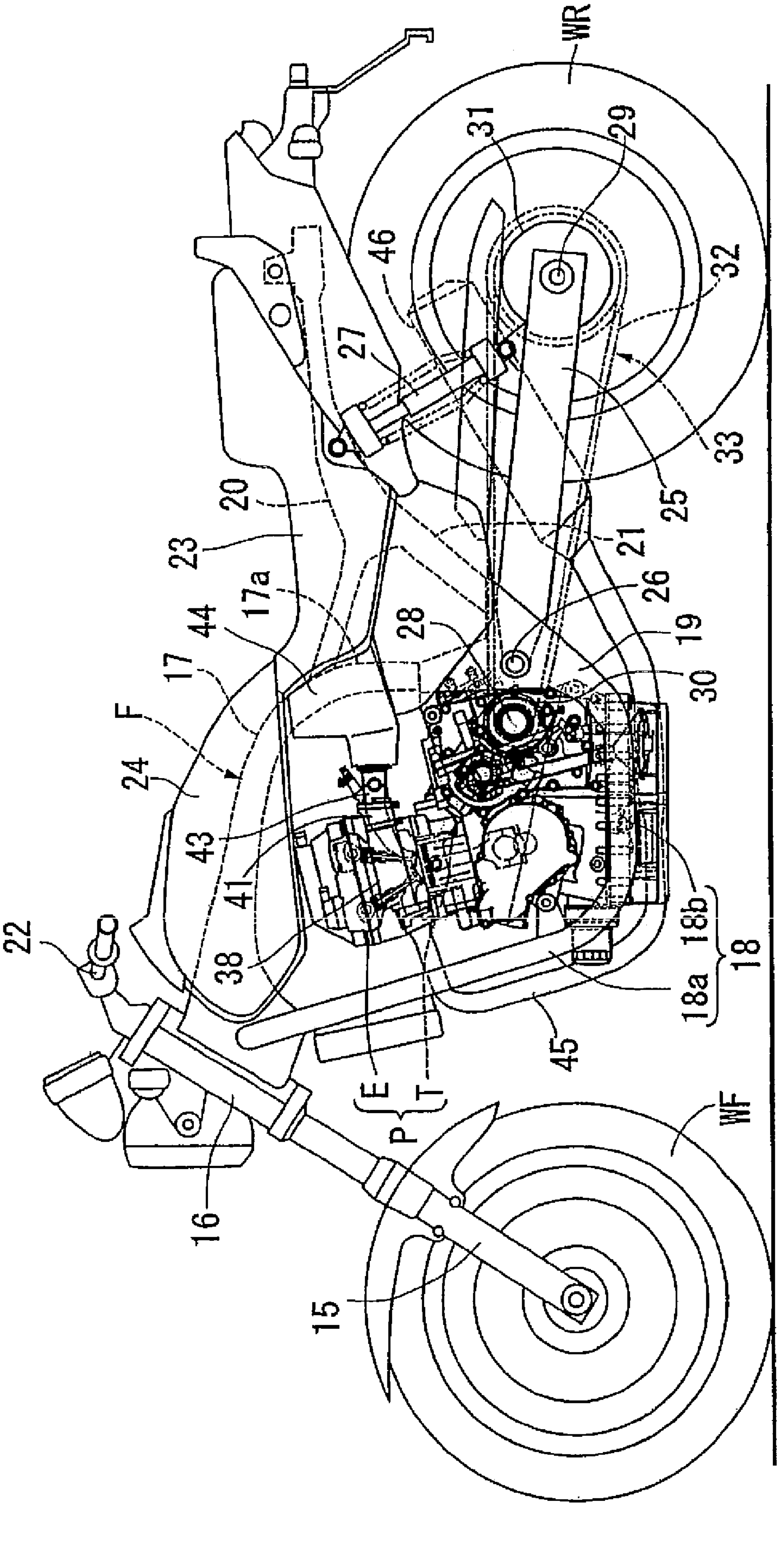
FIG. 1 is a left lateral view of a motorcycle.

Referring first to FIG. 1, a body frame F of the motorcycle includes a head pipe 16, a main frame 17, a pair of left and right down frames 18, pivot plates 19, a pair of left and right seat rails 20 and a pair of left and right connection frames 21. The head pipe 16 steerably supports a front fork 15 which has a lower end rotatably supporting a front wheel WF. The main frame 17 extends rearward from the head pipe 16, bends therefrom and extends downward to form a hanging portion 17*a* at the rear portion thereof. The down frame 18 has a slant portion 18*a* which slants rearward downwardly from the head pipe 16 and a horizontal portion 18*b* which extends rearward from the rear portion of the slant portion 18*a*. In addition, the down frames 18 are located below the main frame 17. The pivot plate 19 connects a rear end of each horizontal portion of the down frames 18 with a lower end of each hanging portion 17*a* of the main frames 17. The seat rail 20 extends rearward from the upper portion of the hanging portion 17*a* of the main frame 17. The connection frame 21 connects the pivot plate 19 with the intermediate portion of the seat rail 20.

A steering handlebar 22 is connected to the upper end of the front fork 15. An occupant's seat 23 is mounted on the seat rails 20. A fuel tank 24 is located in front of the occupant's seat 23 so as to be mounted on and straddle the main frame 17.

Most of a power unit P is disposed in a portion surrounded by the main frame 17 and by the down frames 18. The power unit P includes an in-series four-cylinder internal combustion engine E supported by the down frames 18 and by the pivot plates 19 and a power transmission device T which changes and reduces the speed of the power of the engine E and transmits it to a rear wheel WR.

The pivot plate 19 swingably supports the front end portion of a swing arm 25 via a support shaft 26 and the swing arm 25 has a rear end portion which rotatably supports a rear wheel WR. A rear shock absorber unit 27 is provided between each of the seat rails 20 and a corresponding one of the swing arms 25.

Chain transmission means 33 is provided between an output shaft 28 of the power unit P and an axle 29 of the rear wheel WR. The chain transmission means 33 includes a drive sprocket 30 provided on the output shaft 28, a driven sprocket 31 secured to the axle 29, and an endless chain 32 wound around the drive sprocket 30 and around the driven sprocket 31.

Figure 2:
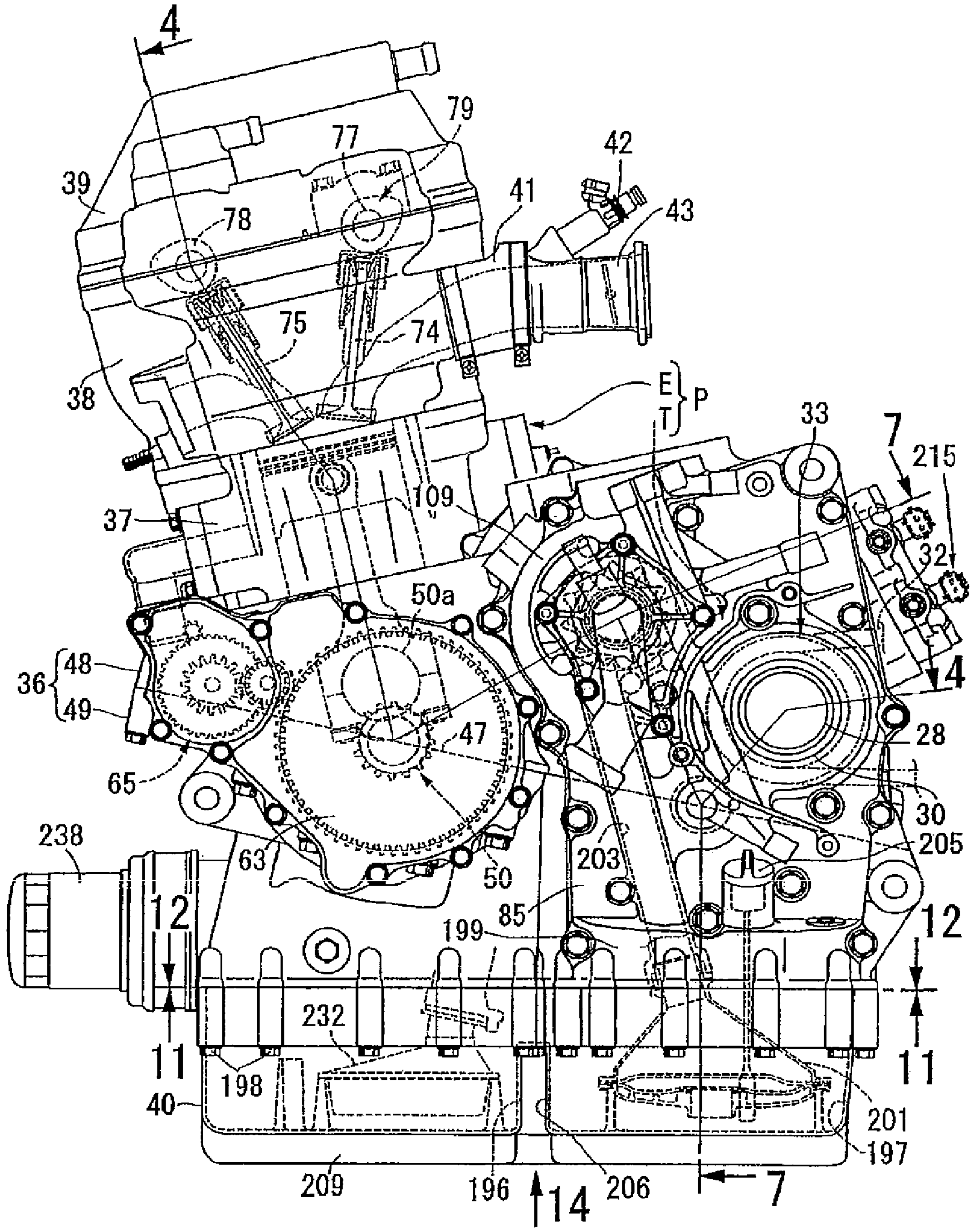
FIG. 2 is a left lateral view of a power unit.
Figure 3:
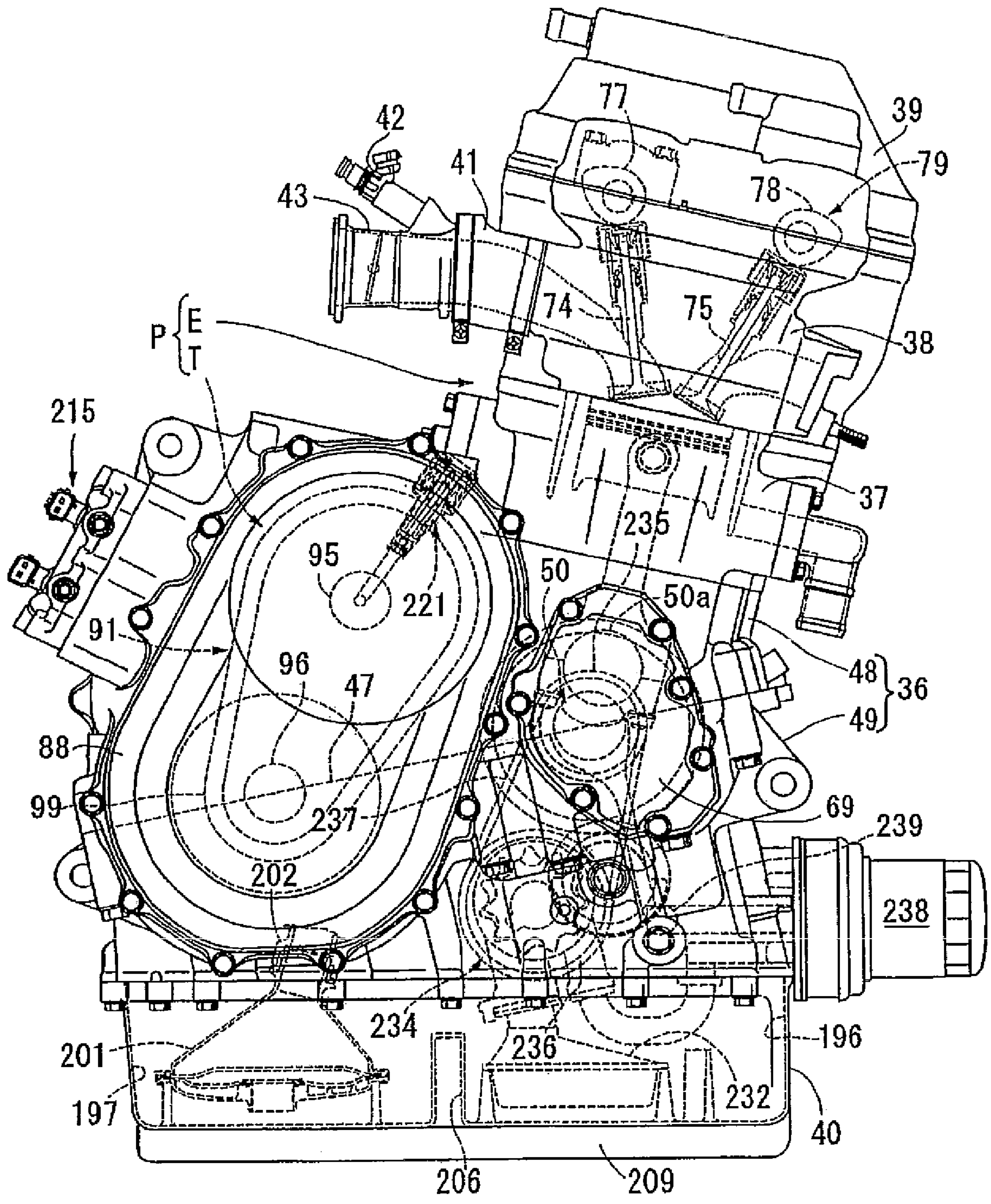
FIG. 3 is a right lateral view of the power unit.

Referring to FIGS. 2 and 3, the internal combustion engine E includes a crankcase 36, a cylinder block 37 joined to the upper portion of the crankcase 36, a cylinder head 38 joined to the upper end of the cylinder block 37, a head cover 39 joined to the cylinder head 38 and an oil pan 40 joined to the lower portion of the crankcase 36.

Intake pipes 41 are each joined to the rear lateral surface of the cylinder head 38 so as to be associated with a corresponding one of the cylinders. The intake pipe 41 is joint at an upstream end to a throttle body 43 attached with a fuel injection valve 42. The throttle body 43 is joined at an upstream end to an air cleaner 44 (see FIG. 1) located on the left side of the body frame F and above the rear portion of the power unit P. Exhaust pipes 45 are each joined to the front lateral surface the cylinder head 38 so as to be associated with a corresponding one of the cylinders. As shown in FIG. 1, the exhaust pipe 45 passes below the right side of the power unit P, extending rearward, and is joined to an exhaust muffler 46 disposed on the right side of the rear wheel WR.

The crankcase 36 includes an upper case half body 48 and a lower case half body 49 which are coupled to each other at a coupling face 47 slanting forwardly upwardly. A crankshaft 50 having an axis extending in the width-direction of the motorcycle is rotatably carried between the upper case half body 48 and the lower case half body 49.

Figure 4:
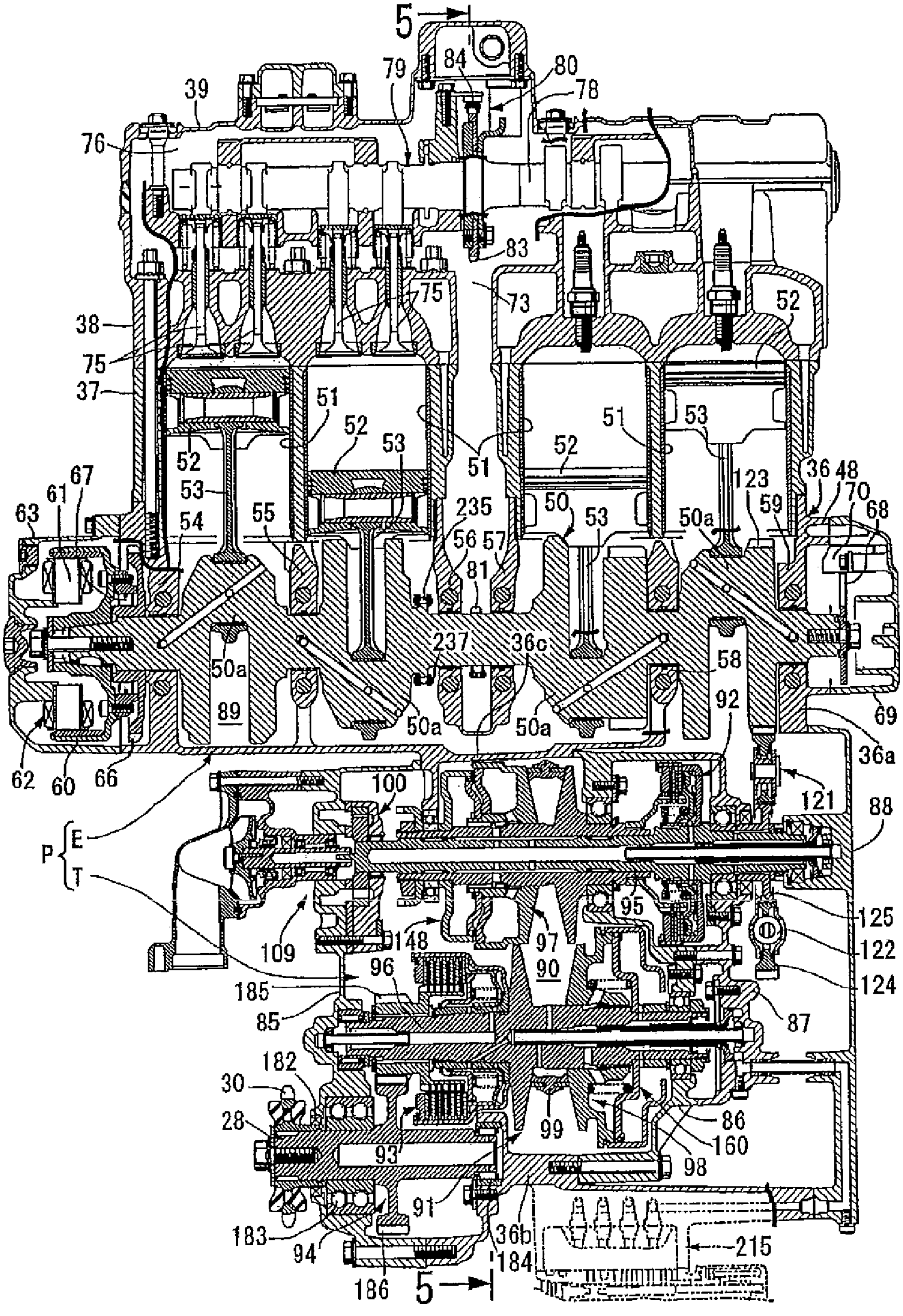
FIG. 4 is a cross-sectional view taken along line 4-4 of FIG. 2.

With additional reference to FIG. 4, the cylinder block 37 is joined to the upper case half body 48 of the crankcase 36 so as to slant forwardly upwardly toward the front of the traveling direction of the motorcycle. The cylinder block 37 is provided with four cylinder bores 51 lined in the axial direction of the crankshaft 50. A piston 52 slidably fitted into each of the cylinder bores 51 is connected via a connecting rod 53 to a crank pin 50*a* provided for the crankshaft 50.

The crankcase 36 is provided with six, first to sixth, journal walls 54 to 59 spaced apart from each other in the axial direction of the crankshaft 50 from the left side to the right side in the state of being mounted on the motorcycle. The crankshaft 50 is rotatably journaled by the first through sixth journal walls 54 to 59.

A rotor 60 is secured to an end of the crankshaft 50 outwardly projecting from the left lateral wall, i.e., the first journal wall 54 of the crankcase 36. A stator 61 constituting a generator 62 along with the rotor 60 is attached to a generator cover 63 fastened to the left lateral wall of the crankcase 36 so as to cover the generator 62.

Figure 5:
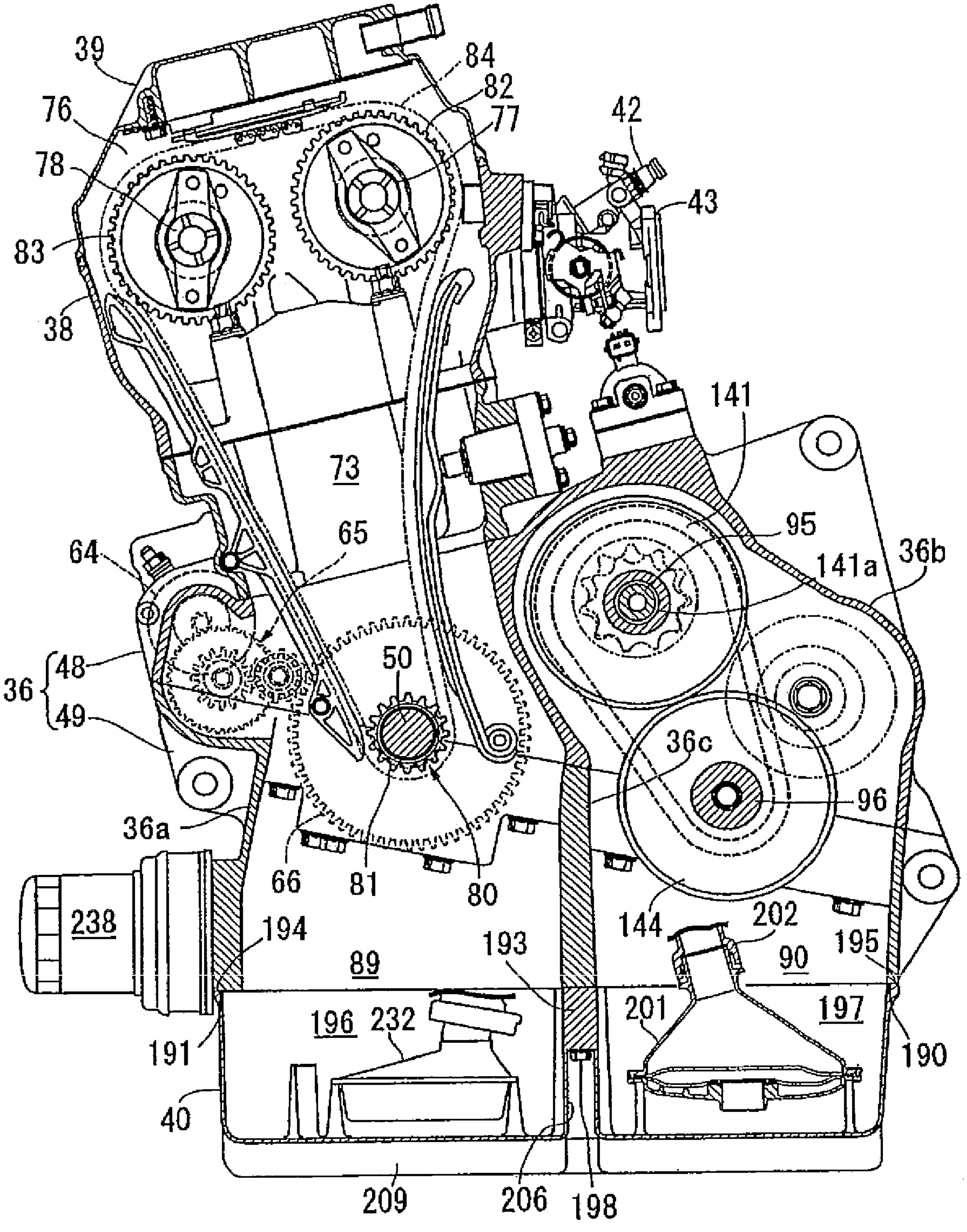
FIG. 5 is a cross-sectional view taken along line 5-5 of FIG. 4.

As illustrated in FIG. 5, a starter motor 64 having a rotational axis parallel to the crankshaft 50 is supported in the generator cover 63 by the crank case 36. A one-way clutch 67 is interposed between a gear 66 transmitting power from the starter motor 64 via a reduction gear mechanism 65 and the rotor 60 of the generator 62 so as to enable power transmission from the side of the gear 66.

As clearly shown in FIG. 4, a pulser 68 is secured to an end of the crankshaft 50 projecting from the right lateral wall, i.e., the sixth journal wall 59 of the crankcase 36. A rotation number sensor 70 is attached inside a pulser cover 69 so as to face the outer circumference of the pulser 68. The pulser cover 69 is joined to the crankcase 36 to cover the pulser 68.

The third and fourth journal walls 56, 57 are disposed close to each other without putting the cylinder bore 51 therebetween. A chain chamber 73 is formed in the cylinder block 37 and in the cylinder head 38 at a portion corresponding to between the third and fourth journal walls 56, 57.

The cylinder head 38 is provided with a pair of intake valves 74 for each cylinder and with a pair of exhaust valves 75 for each cylinder. The intake valves 74 and the exhaust valves 75 are provided in an openable and closable manner while being biased by springs in the valve-closing direction. A valve operating chamber 76 is formed between the cylinder head 38 and the head cover 39. A valve operating system 79 is received in the valve operating chamber 76 to drivingly open and close the intake valves 74 and the exhaust valves 75. The valve operating system 79 includes an intake side cam shaft 77 disposed parallel to the crankshaft 50 to be associated with the intake valves 74 and an exhaust side cam shaft 78 disposed parallel to the crankshaft 50 to be associated with the exhaust valves 75.

Rotational power is transmitted from the crankshaft 50 to the intake side camshaft 77 and to the exhaust side camshaft 78 at a reduction ratio of ½by timing transmission means 80. The timing transmission means 80 includes a drive sprocket 81, driven sprockets 82, 83 and an endless timing chain 84. The drive sprocket 81 is provided on the crankshaft 50 between the third and fourth journal walls 56, 57. The driven sprockets 82 and 83 are provided on the intake side cam shaft 77 and on the exhaust side cam shaft 78, respectively, at respective positions corresponding to the drive sprocket 81. The timing chain 84 is wound around the drive sprocket 81 and around the driven sprockets 82, 83 so as to be able to run in the chain chamber 73.

Figure 6:
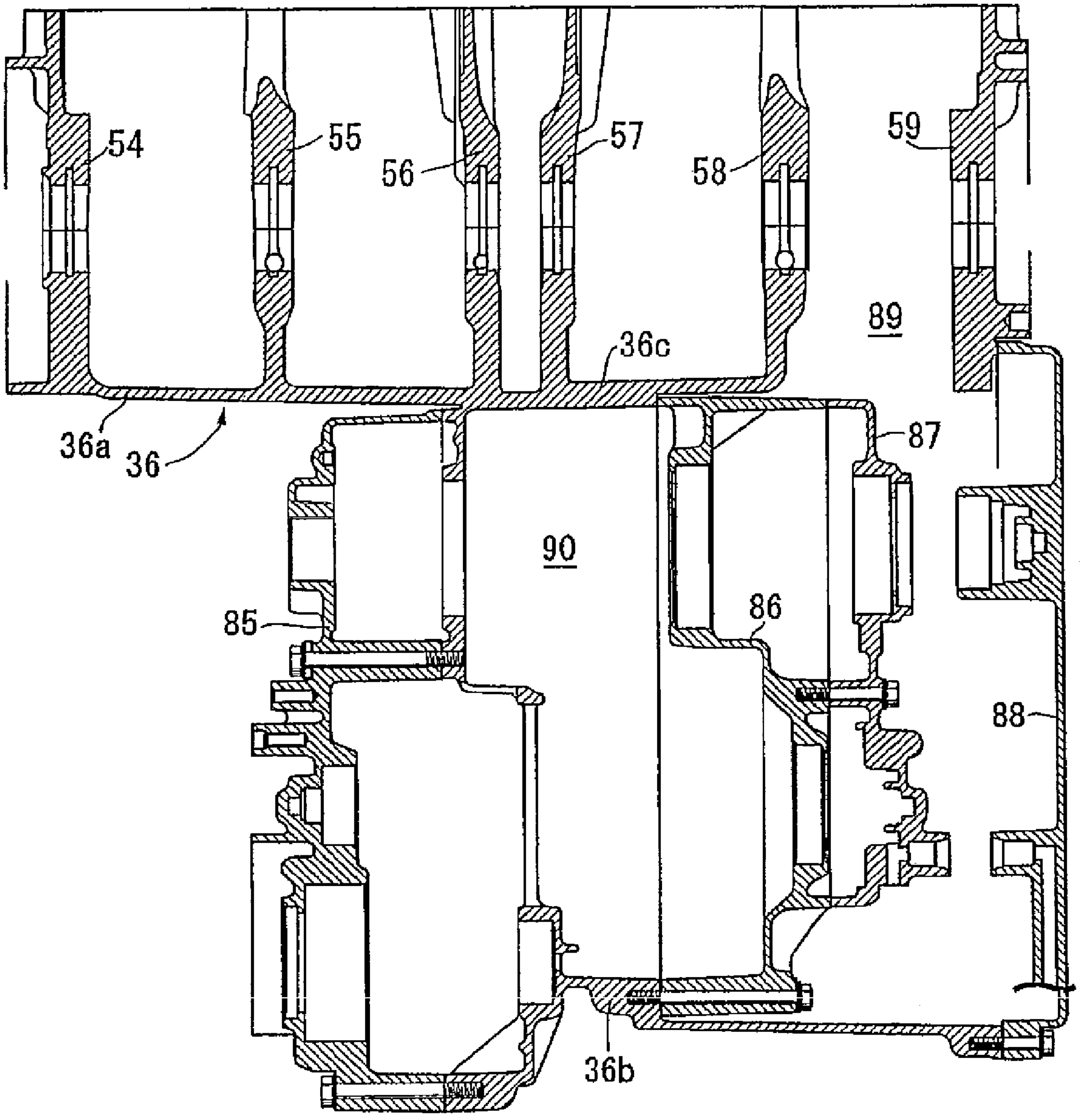
FIG. 6 is a cross-sectional view illustrating a crankcase and a cover member joined to the crankcase, taking along the same cross-section as that of FIG. 4.

As illustrated in FIG. 6, the crankcase 36 includes a front half portion 36*a* and a rear half portion 36*b*. The front half portion 36*a* is provided with the first to sixth journal walls 54 to 59. The rear half portion 36*b* has a right end portion flush with a right end portion of the front half portion 36*a* and a left end portion located inward of a left end portion of the front half portion 36*a*. In addition, the rear half portion 36*b* has a width narrower than that of the front half portion 36*a* in the axial direction of the crankshaft 50. A left cover member 85 is joined to the rear half portion 36*b* from the left side and a first right cover member 86 is joined to the rear half portion 36*b* from the right side. A second right cover member 87 is joined to the first right cover member 86 from the right side. A third right cover member 88 is joined to the front half portion 36*a* and rear half portion 36*b* of the crankcase 36 so as to cover the second right cover member 87 from the right outside.

The crankcase 36 is internally formed with a crank chamber 89 which receives therein most of the crankshaft 50 and communicates with the cylinder bores. The crankcase 36 and the left cover member 85, the first right cover member 86 and the second right cover member 87 each of which is joined to the crankcase 36 define a continuously variable transmission chamber 90. The crankcase 36 is formed with a partition wall portion 36*c* which is disposed at a connection portion between the front half portion 36*a* and the rear half portion 36*b* to separate between the crank chamber 89 and the continuously variable transmission chamber 90.

Figure 7:
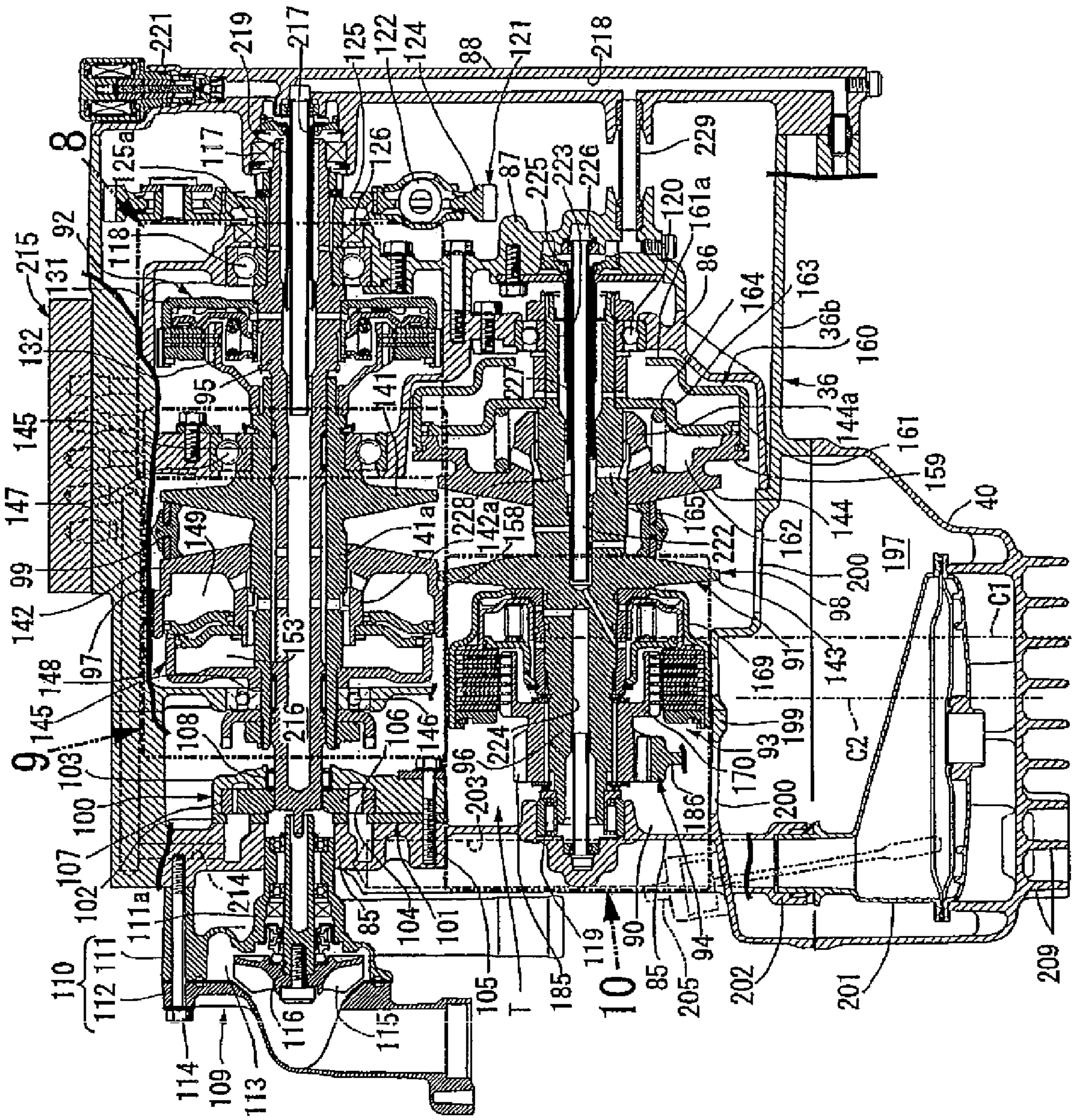
FIG. 7 is an enlarged cross-sectional view taken along line 7-7 of FIG. 2.

Referring to FIG. 7, the power transmission device T including the continuously variable transmission 91 is housed in the continuously variable transmission chamber 90. The power transmission device T includes the belt type continuously variable transmission 91 which enables a continuously variable speed by hydraulic control and an input clutch 92 interposed between the crankshaft 50 and the continuously variable transmission 91. The power transmission device T further includes the output shaft 28 (see FIGS. 1 and 4) which outwardly projects from the left cover member 85 to transmit power to the rear wheel WR and a start clutch 93 and a gear transmission mechanism 94 interposed between the continuously variable transmission 91 and the output shat 28.

The continuously variable transmission 91 includes a drive pulley shaft 95 and a driven pulley shaft 96 both parallel to the crankshaft 50, a drive pulley 97 provided on the drive pulley shaft 95, a driven pulley 98 provided on the driven pulley shaft 96 and an endless belt 99 wound around the drive pulley 97 and around the driven pulley 98. In addition, the continuously variable transmission 91 is disposed rearward of the axis of the crankshaft 50.

The drive pulley shaft 95 rotatably passes through the rear half portion 36*b* of the crankcase 36, the first right cover member 86 and the second right cover member 87. The driven pulley shaft 96 rotatably passes through the rear half portion 36*b* of the crankcase 36 and the first right cover member 86.

The external wall of the continuously variable transmission chamber 90 is composed of the rear half portion 36*b* of the crankcase 36, the left cover member 85, the first right cover member 86 and the second right cover member 87. A first oil pump 100 is disposed at the left cover member 85 which is a wall portion on one end side of the drive pulley shaft 95 so as to be coupled to one end of the drive pulley shaft 95.

The first oil pump 100 is a trochoid pump. A pump case 101 for the first oil pump 100 includes the left cover member 85, a flat plate-like first case member 102 abutted against the inner surface of the left cover member 85 and a bowl-like second case member 103. A first pump chamber 104 is defined between the first case member 102 and the second case member 103. The first case member 102 is gripped between the left cover member 85 and the second case member 103. The first and second case members 102, 103 are co-fastened to the left cover member 85 with a plurality of bolts 105.

One end portion of the drive pulley shaft 95 rotatably passes through the second case member 103 of the pump case 101 and projects into the first pump chamber 104. One end of the drive pulley shaft 95 is coupled to an inner rotor 106, of the inner rotor 106 and an outer rotor 107, incapably of relative rotation. The inner rotor 106 and the outer rotor 107 mesh with each other and are housed in the first pump chamber 104. A roller bearing 108 is interposed between the second case member 103 and the drive pulley shaft 95.

A water pump 109 coaxial with the first oil pump 100 is disposed on the external surface side of the left cover member 85 at a portion corresponding to the first oil pump 100. A pump case 110 of the water pump 109 includes a third case member 111 and a fourth case member 112. The third case member 111 has a tubular support cylindrical portion 111*a* which is formed integrally therewith, extends coaxially with the drive pulley shaft 95 and is partially fitted into the left cover member 85 in a liquid-tight manner. The fourth case member 112 is joined to the third case member 111 to define a second pump member 113 therebetween. The third and fourth case members 111, 112 are co-fastened and joined to the left cover member 85 with a plurality of bolts 114.

An impeller 115 housed in the second pump chamber 113 is secured to one end of a pump shaft 116. The pump shaft 116 is liquid-tightly and rotatably inserted into a support cylinder 111*a*. One end of the pulley shaft 95 is coaxially coupled to the other end of the pump shaft 116 incapably of relative rotation.

On the other hand, the other end of the drive pulley shaft 95 is fitted into the third right cover member 88 via an annular sealing member 117. A ball bearing 118 is interposed between the drive pulley shaft 95 and the second right cover member 87.

One end of driven pulley shaft 96 is rotatably journaled by the left cover member 85 via a roller bearing 119. The other end of the driven pulley shaft 96 rotatably passes through the first right cover member 86. A ball bearing 120 is interposed between the driven pulley shaft 96 and the first right cover member 86.

Rotational power from the crankshaft 50 is transmitted to the drive pulley shaft 95 via a primary reduction gear mechanism 121 and via a damper spring 122. The primary reduction gear mechanism 121 reduces the speed of the rational power from the crankshaft 50 and transmits it toward the drive pulley shaft 95. The primary reduction gear mechanism 121 includes a primary drive gear 123 provided on the crankshaft 50 and a primary driven gear 124 meshing with the primary drive gear 123. As clearly shown in FIG. 4, the primary drive gear 123 is integrally formed on the crankshaft 50 so as to be located between the fifth and sixth journal walls 58, 59. On the other hand, a transmitting member 125 having a cylindrical portion 125*a* coaxially surrounding the drive pulley shaft 95 is secured to the drive pulley shaft 95 between the second and third right cover members 87, 88. The primary driven gear 124 is carried on the transmitting member 125 so as to enable relative rotation within a limited range. The damper spring 122 is provided between the primary driven gear 124 and the transmitting member 125. An annular sealing member 126 is interposed between the cylindrical portion 125*a* of the transmitting member 125 and the second right cover member 87.

Figure 8:
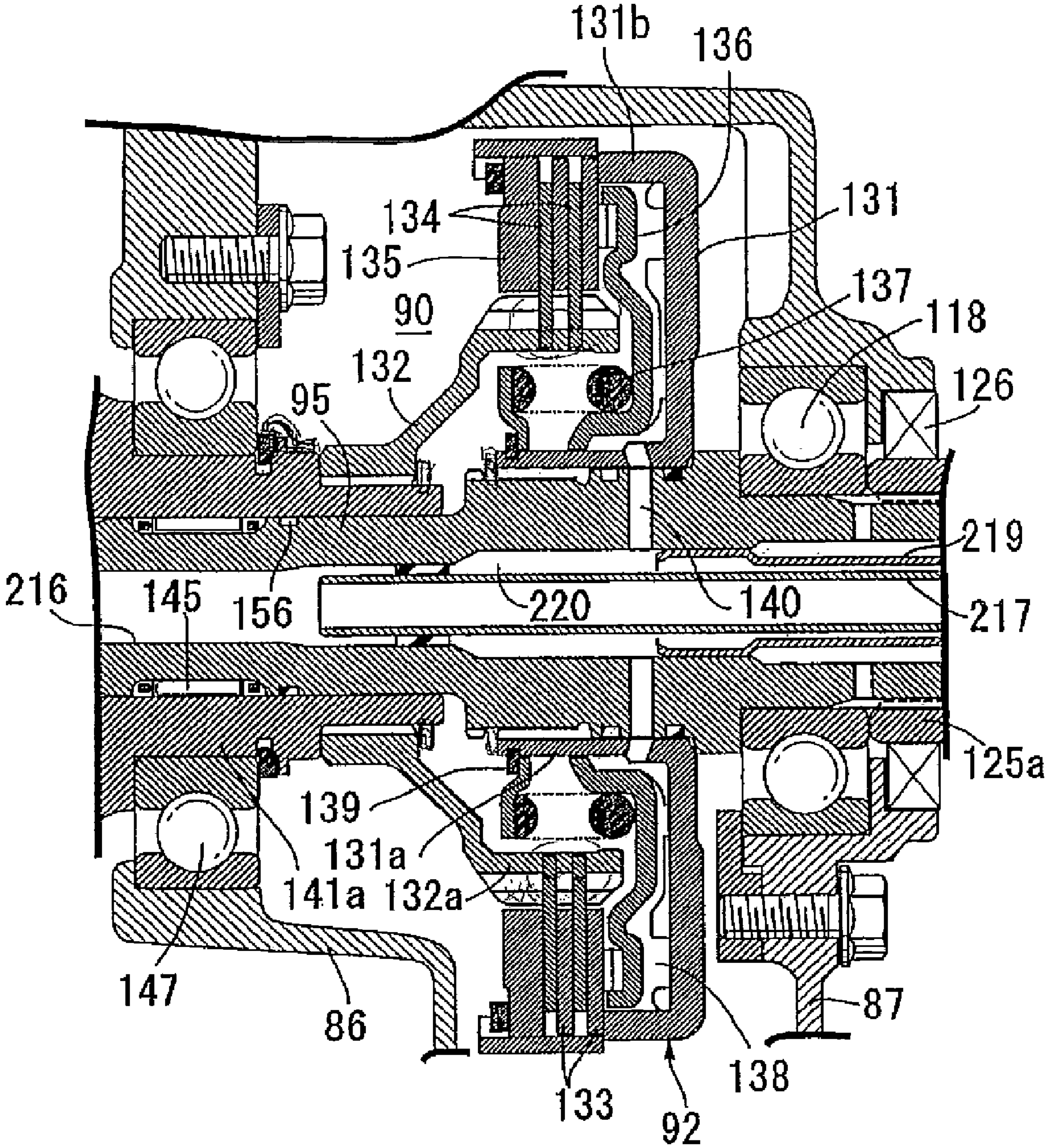
FIG. 8 is an enlarged view of a portion indicated with arrow 8 of FIG. 7.

Referring to FIG. 8, the input clutch 92 is attached to the drive pulley shaft 95 between the first and second right cover members 86, 87 in the continuously variable transmission chamber 90. The input clutch 92 includes a clutch outer 131, a clutch inner 132, a plurality of first drive friction plates 133, a plurality of first driven friction plates 134, a pressure-receiving plate 135, a pressurizing plate 136 and a clutch spring 137. The clutch outer 131 has a tubular inner cylindrical portion 131*a* joined to the drive pulley shaft 95 that is incapably of relative rotation and an outer cylindrical portion 131*b* coaxially surrounding the inner cylindrical portion 131*a*. The clutch inner 132 has a cylindrical portion 132*a* coaxially disposed between the inner cylindrical portion 131*a* and outer cylindrical portion 131*b* of the clutch outer 131. The first drive friction plates 133 are axially slidably spline-fitted to the outer cylindrical portion 131*b* of the clutch outer 131. The first driven friction plates 134 are alternately superimposed on the first drive friction plates 133 and axially slidably spline-fitted to the cylindrical portion 132*a* of the clutch inner 132. The pressure-receiving plate 135 is secured to the outer cylindrical portion 131*b* of the clutch outer 131 so as to face, from one axial direction, the first drive friction plates 133 and first driven friction plates 134 that are superimposed on each other. The pressurizing plate 136 faces, from the other axial direction, the first drive friction plates 133 and first driven friction plates 134 that are superimposed on each other. The clutch spring 137 biases the pressurizing plate 136 toward the side where the pressurizing plate 136 is spaced from the pressure-receiving plate 135.

The pressuring plate 136 is adapted to define a first hydraulic chamber 138 between the clutch outer 131 and the pressurizing plate 136. The pressurizing plate 136 is slidably supported by the inner cylindrical portion 131*a* and outer cylindrical portion 131*b* of the clutch outer 131. The clutch spring 137 is compressively provided between the pressurizing plate 136 and a spring-receiving member 139 attached to the inner cylindrical portion 131*a* of the clutch outer 131. The drive pulley shaft 95 is provided with a first oil hole 140 communicating with the first hydraulic chamber 138.

With such an input clutch 92, the hydraulic pressure of the first hydraulic chamber 138 is increased to move the pressurizing plate 136 forward, i.e., toward the pressure-receiving plate 135 side against the spring force of the clutch spring 137. The first drive friction plates 133 and first driven friction plates 134 are pressurized and gripped between the pressurizing plate 136 and the pressure-receiving plate 135. Thus, a clutch-on state is brought where power is transmitted from the drive pulley shaft 95 to the clutch inner 132. A clutch-off state is brought according to the reduced hydraulic pressure of the first hydraulic chamber 138.

Figure 9:
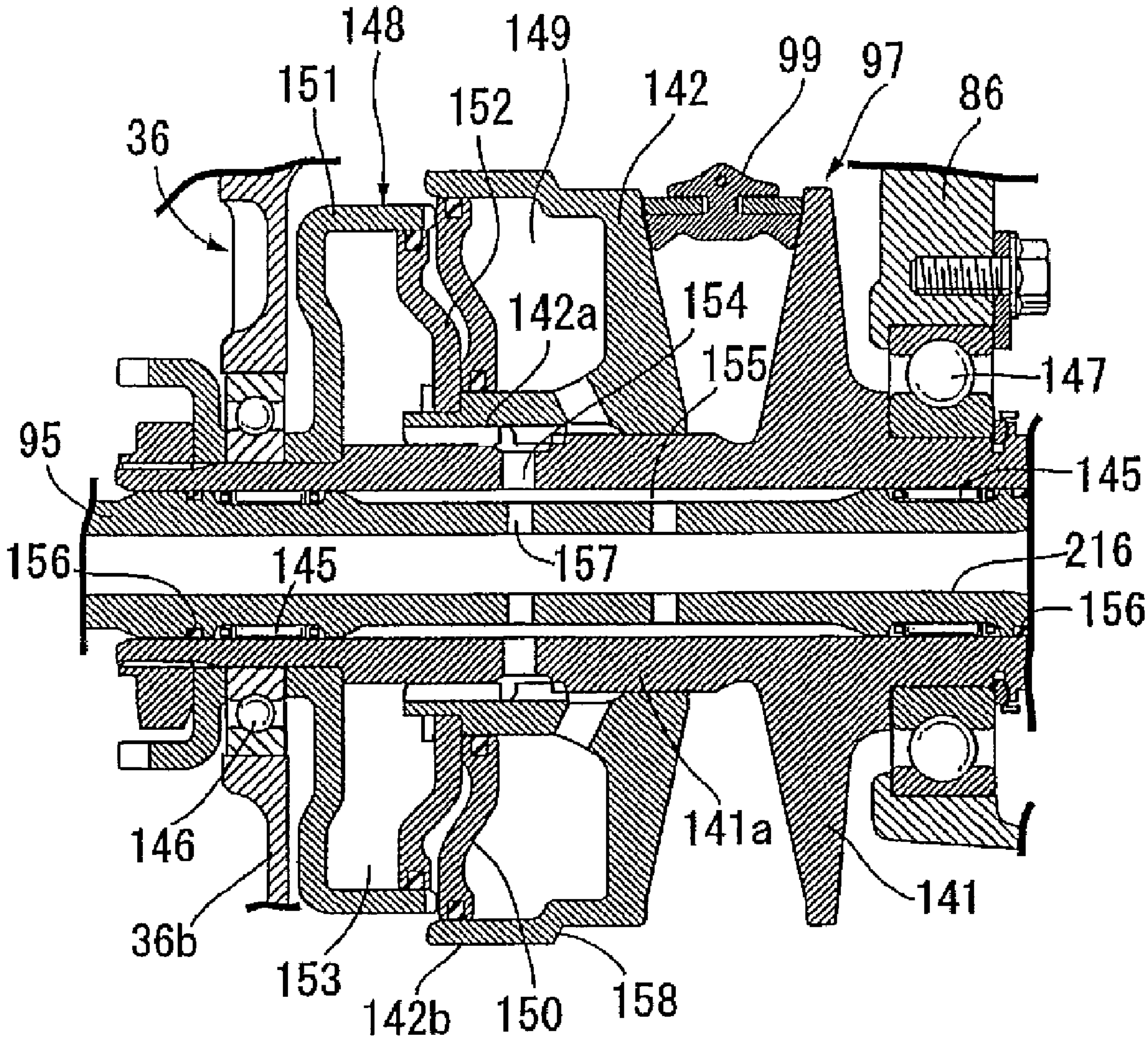
FIG. 9 is an enlarged view of a portion indicated with arrow 9 of FIG. 7.

Referring to FIG. 9, the drive pulley 97 includes a drive side stationary pulley half body 141 and a drive side movable pulley half body 142. The stationary pulley half body 141 has a tubular cylinder-shaft portion 141*a* integrally formed therewith to coaxially surround the drive pulley shaft 95 and is carried on the drive pulley shaft 95 for relative rotation. The movable pulley half body 142 is carried on the cylinder-shaft portion 141*a* incapably of relative rotation but capably of axial slide and is opposed to the drive side stationary pulley half body 141. As shown in FIG. 7, the driven pulley 98 includes a driven side stationary pulley half body 143 integrally provided on the driven pulley shaft 96 and a driven side movable half body 144 which is carried on a driven pulley shaft 96 incapably of relative rotation but capably of axial slide and is opposed to the driven side stationary pulley half body 143.

The belt 99 is wound around the drive pulley 97 and around the driven pulley 98. The axial relative positions of the drive side movable pulley half body 142 to the drive side stationary pulley half body 141 and of the driven side movable pulley half body 144 to the movable side stationary pulley half body 143 are hydraulically controlled to change the winding radius of the belt 99 around the drive pulley 97 and around the driven pulley 98. Thus, the power transmission from the drive pulley shaft 95 to the driven pulley shaft 96 is changed in speed in a stepless manner.

The cylinder-shaft portion 141*a* that is integrally provided for the drive side stationary pulley half body 141 coaxially surrounds the drive pulley shaft 95 in such a manner that a pair of needle bearings 145, 145 are interposed between the cylinder-shaft portion 141*a* an the drive pulley shaft 95. One end of the cylinder-shaft portion 141*a* rotatably passes through the left lateral wall of the rear half portion 36*b* of the crankcase 36. A ball bearing 146 is interposed between the cylinder-shaft portion 141*a* and the crankcase 36. The cylinder-shaft portion 141*a* rotatably passes through the first right cover member 86 and is coupled to the clutch inner 132 of the input shaft 92 coaxially and incapably of relative rotation. The cylinder-shaft portion 141*a*, i.e., the drive side stationary pulley half body 141 is rotated together with the drive pulley shaft 95 in the clutch-on state of the input clutch 92. A ball bearing 147 is interposed between the cylinder-shaft portion 141*a* and the first right cover member 86.

The drive side movable pulley half body 142 is disposed at a position opposed to the drive side stationary pulley half body 141 from the side opposite to the first right cover member 86. In addition, the drive side movable pulley half body 142 has a cylindrical first boss portion 142*a* that is formed integrally therewith to coaxially surround the cylinder-shaft portion 141*a* and to be coupled to the cylinder-shaft portion 141*a* incapably of relative rotation but capably of axial slide. A drive side hydraulic drive mechanism 148 for slidably driving the drive side movable pulley half body 142 is disposed on the cylinder-shaft portion 141*a* on the side opposed to the drive side stationary pulley half body 141 with respect to the drive side movable pulley half body 142.

The drive side hydraulic drive mechanism 148 includes a cylindrical case portion 142*b*, a ring plate-like first end plate 150, a stationary bawl-like body 151 and a second end plate 152. The case portion 142*b* is integrally formed on the outer circumferential portion of the drive side movable pulley half body 142 so as to coaxially surround the first boss portion 142*a* and to extend oppositely to the drive side stationary pulley half body 141. The first end plate 150 is in slidable contact with the inner circumference of the case portion 142*b* and with the outer circumference of the first boss portion 142*a* in a liquid-tight manner to define a second hydraulic pressure chamber 149 between the drive side movable pulley half body 142 and the first end plate 150. The stationary bowl-like body 151 is secured to the cylinder-shaft portion 141*a* on the side opposite to the drive side stationary pulley half body 141 with respect to the drive side movable pulley half body 142 and is abutted against the first end plate 150 at its leading end portion. The second end plate 152 is in slidable contact with the inner circumference of the stationary bowl-like body 151 in a liquid-tight manner and is secured at an inner circumferential portion to the first boss portion 142*a* to define a third hydraulic chamber 153 between the stationary bowl-like body 151 and the second end plate 152.

The cylinder-shaft portion 141*a* is provided with a second oil hole 154 communicating with the second and third hydraulic chambers 149, 153. An annular chamber 155 is defined between the drive pulley shaft 95 and the cylinder-shaft portion 141*a* to communicate with the second oil hole 154. A pair of annular sealing members 156, 156 are attached to the outer circumference of the drive pulley shaft 95 outwardly of both the needle bearings 145, 145 so as to seal both the axial ends of the annular chamber 155. Further, the drive pulley shaft 95 is provided with a plurality of third oil holes 157 communicating with the annular chamber 155.

In this way, the drive side movable pulley half body 142 is biased by the hydraulic force according to the hydraulic pressure applied to the second and third hydraulic chambers 149, 153 to move the drive side movable pulley half body 142 close to the drive side stationary pulley half body 141 to increase the winding radius of the belt 99 wound around the drive pulley 97.

The driven side stationary pulley half body 143 is integrally provided on the driven pulley shaft 96 at a position corresponding to the drive side movable pulley half body 142 of the drive pulley 97. The drive side movable pulley half body 142 and the driven side stationary pulley half body 143 are disposed to partially overlap each other as viewed from the respective axial directions of the drive pulley shaft 95 and the driven pulley shaft 96. In order to avoid the mutual interference between the drive side movable pulley half body 142 and the driven side stationary pulley half body 143, a relief recess portion 158 is provided on the outer circumference of the drive side movable pulley half body 142.

Focusing on FIG. 7, the driven side movable pulley half body 144 is disposed at a position corresponding to the drive side stationary pulley half body 141 of the drive pulley 97. In addition, the driven side movable pulley half body 144 is integrally provided in an internal circumferential portion with a second boss portion 144*a*. The second boss portion 144*a* extends toward the side opposite to the driven side stationary pulley half body 143 and coaxially surrounds the driven pulley shaft 96. The second boss portion 144*a* is coupled to the driven pulley shaft 96 incapably of relative rotation but capably of axial movement.

In addition, the drive side stationary pulley half body 141 and the driven side movable pulley half body 144 are disposed to partially overlap each other as viewed from the respective axial directions of the drive pulley shaft 95 and the driven pulley shaft 96. In order to avoid the occurrence of the mutual interference between the drive side stationary pulley half body 141 and the driven side movably pulley half body 144, a relief recess portion 159 is provided on the outer circumference of the driven side movable pulley half body 144.

As described above, the relief recess portion 158 is provided on the outer circumference of the drive side movable pulley half body 142 to avoid the occurrence of the mutual interference between the drive side movable pulley half body 142 and the driven side stationary pulley half body 143. In addition, the relief recess portion 159 is provided on the outer circumference of the driven side movable pulley half body 144 to avoid the occurrence of the mutual interference between the drive side stationary pulley half body 141 and the driven side movably pulley half body 144. Thus, the drive pulley shaft 95 and the driven pulley shaft 96 are made close to each other to bring the continuously variable transmission 91 into a compact configuration.

A driven side hydraulic drive mechanism 160 for slidably driving the driven side movable pulley half body 144 is disposed on the driven pulley shaft 96 on the side opposite to the driven side stationary pulley half body 143 with respect to driven side movable pulley half body 144. The driven side hydraulic drive mechanism 160 includes a tubular case member 161, an end wall member 163 and a coil spring 164. The case member 161 coaxially surrounds the second boss portion 144*a*, is secured at one end to the outer circumferential portion of the driven side movable pulley half body 144 and extends toward the side opposite to the driven side stationary pulley half body 143. The end wall member 163 is in slidable contact with the inner circumference of the case member 161 in a liquid-tight manner to define a fourth hydraulic chamber 162 between the driven side movable pulley half body 144 and the end wall member 163. The inner circumferential portion of the end wall member 163 is fixed to the driven pulley shaft 96. The coil spring 164 is compressively provided between the driven side movable half body 144 and the end wall member 163 to prevent the slack of the belt 99 encountered when the internal combustion engine E is stopped.

The driven pulley shaft 96 is provided with a fourth oil hole 165 communicating with the fourth hydraulic chamber 162. In this way, the driven side movable pulley half body 144 is biased by the hydraulic force according to the hydraulic pressure applied to the fourth hydraulic chamber 162 to move the driven side movable pulley half body 144 close to the driven side stationary pulley half body 143 to increase the winding radius of the belt 99 wound around the driven pulley 98. In addition, a restrictive plate portion 161*a* is integrally provided at the other end of the case member 161 to protrude radially inwardly. The restrictive plate portion 161*a* abuts against the end wall member 163 from the side opposite to the driven side stationary pulley half body 143 to restrict the movement of the driven side movable pulley half body 144 close to the driven side stationary pulley half body 143.

Figure 10:
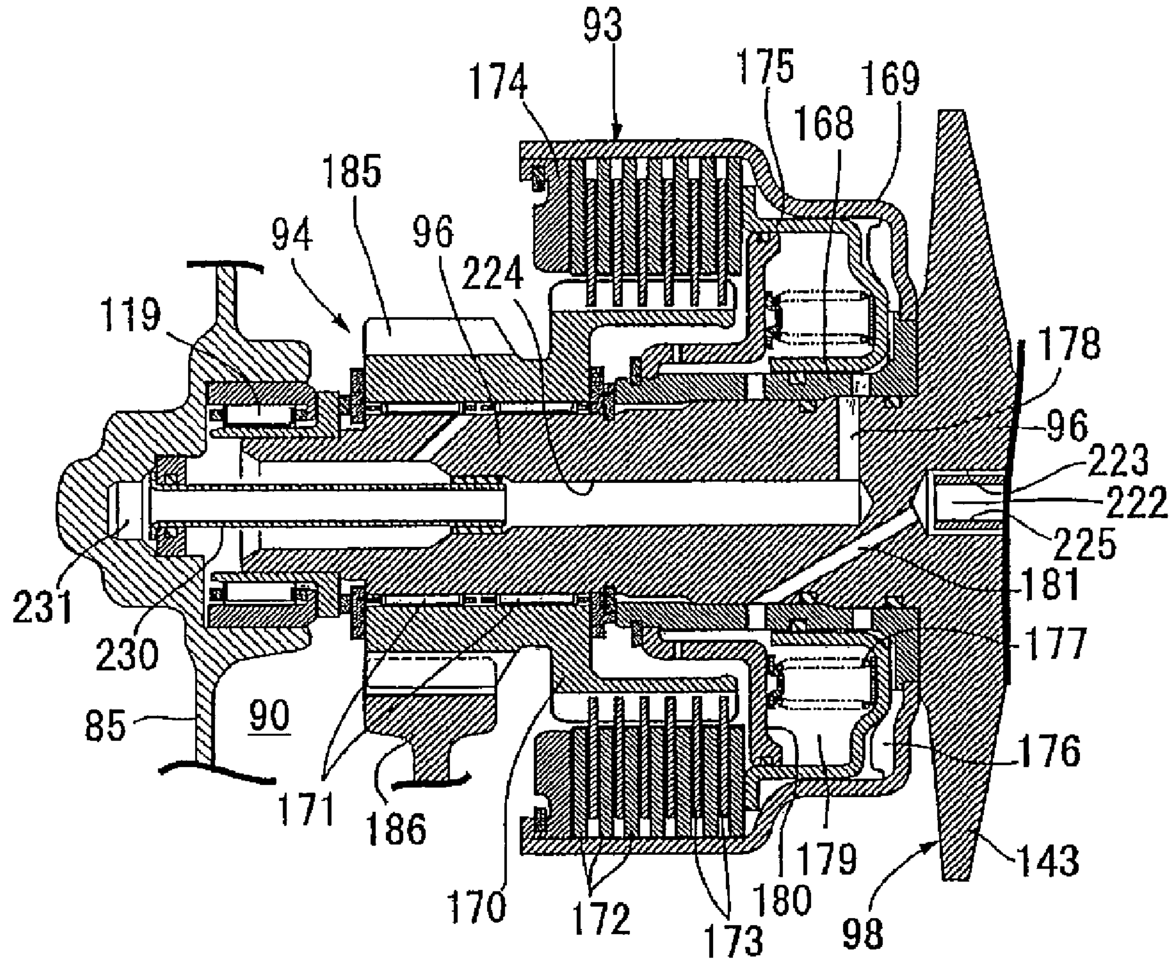
FIG. 10 is an enlarged view of a portion indicated with arrow 10 of FIG. 7.

Referring to FIG. 10, the start clutch 93 is mounted to the driven pulley shaft 96 between the driven pulley 98 of the continuously variable transmission 91 and the left cover member 85. The start clutch 93 includes a clutch outer 169, a clutch inner 170, a plurality of second drive friction plates 172, a plurality of second driven friction plates 173, a pressure-receiving plate 174; a piston 175 and a spring 177. A tubular boss member 168 is joined to the inner circumference of the clutch outer 169 and to the driven pulley shaft 96 incapably of relative rotation. The clutch inner 170 is coaxially surrounded by the clutch outer 169 and carried on the driven pulley shaft 96 via a needle bearing 171 for relative rotation. The second drive friction plates 172 are engaged with the clutch outer 169 incapably of relative rotation. The second driven friction plates 173 are engaged with the clutch inner 170 incapably of relative rotation and alternately superposed on the second drive friction plates 172. The pressure-receiving plate 174 is fixedly supported by the clutch outer 169 so as to face the second drive and driven friction plates 172, 173 alternately superposed on each other. The piston 175 grips the second drive and driven friction plates 172, 173 between the pressure-receiving plate 174 and the piston 175 and defines a fifth hydraulic chamber 176 between the clutch outer 169 and the piston 175. The spring 177 biases the piston 175 in a direction to reduce the volume of the fifth hydraulic chamber 176.

The inner circumferential portion of the piston 175 is in slidable contact with the outer circumferential portion of the boss member 168 in a liquid-tight manner. The outer circumferential portion of the piston 175 is in slidable contact with the clutch outer 169 in a liquid-tight manner. In addition, the driven pulley shaft 96 is provided with a fifth oil hole 178 communicating with the fifth hydraulic chamber 176. According to an increase in the hydraulic pressure of the fifth hydraulic chamber 176, the piston 175 is operated to grip and pressurize the second drive and driven friction plates 172, 173 between the pressure-receiving plate 174 and the piston 175. Thus, the start clutch 93 is brought into a clutch-on state where the rotational power transmitted from the driven pulley shaft 96 to the clutch outer 169 is transmitted to the clutch inner 170.

A wall member 180 is secured at an inner circumferential portion to the boss member 168 to define a canceller chamber 179 between the piston 175 and the wall member 180 and on the side opposite to the fifth hydraulic chamber 176. The piston 175 is in slidable contact with the outer circumferential portion of the wall member 180 in a liquid-tight manner. Additionally, the spring 177 is housed in the canceller chamber 179 and interposed between the piston 175 and the wall member 180. The driven pulley shaft 96 and the boss member 169 are provided with a branch oil passage 181 adapted to direct lubricating oil to the canceller chamber 179. Even if a centrifugal force resulting from rotation is applied to the oil in the fifth hydraulic chamber 176 under reduced pressure to generate a force pressuring the piston 175, the same centrifugal force is applied to the oil in the canceller chamber 179. Thus, it can be avoided that the piston 175 may undesirably be moved to grip the second drive and driven friction plates 172, 173 between the pressure-receiving plate 174 and the piston 175.

As shown in FIG. 4, one end of the output shaft 28 rotatably passes through the left cover member 85. An annular sealing member 182 and a ball bearing 183 are interposed between the output shaft 28 and the left cover member 85 in the order from the external side. The drive sprocket 30 constituting part of the chain transmission means 33 is secured to one end of the output shaft 28 extending from the left cover member 85. The other end of the output shaft 28 is rotatably journaled by the rear half portion **36*b* of the crankcase 36 via a roller bearing 184**.

In FIG. 10, the gear transmission mechanism 94 is disposed between the crankcase 36 and the left cover member 85 and installed between the clutch inner 170 of the start clutch 93 and the output shaft 28. The gear transmission mechanism 94 includes a drive gear 185 formed integrally with the clutch inner 170 and a driven gear 186 provided integrally with the output shaft 28 so as to mesh with the drive gear 185. In the clutch-on state of the start clutch 93, the rotational power of the driven pulley shaft 96 is transmitted to the output shaft 28 via the gear transmission mechanism 94.

With reference to FIG. 7, the drive pulley shaft 95 passes through the second right cover member 87 interposed between the crank chamber 89 and the continuously variable transmission chamber 90, of the rear half portion **36*b* of the crankcase 36, the left cover member 85, the first right cover member 86 and the second right cover member 87 constituting the outer wall of the continuously variable transmission chamber 90. The annular sealing member 126 is interposed between the second right cover member 87 and the transmitting member 125 fixedly brought into close contact with the outer circumference of the drive pulley shaft 95. Also the annular sealing member 117 is interposed between the other end of the tubular drive pulley shaft 95 and the third right cover member 88. In this way, the continuously variable transmission chamber 90 is liquid-tightly isolated from the crank chamber 89**.

Figure 11:
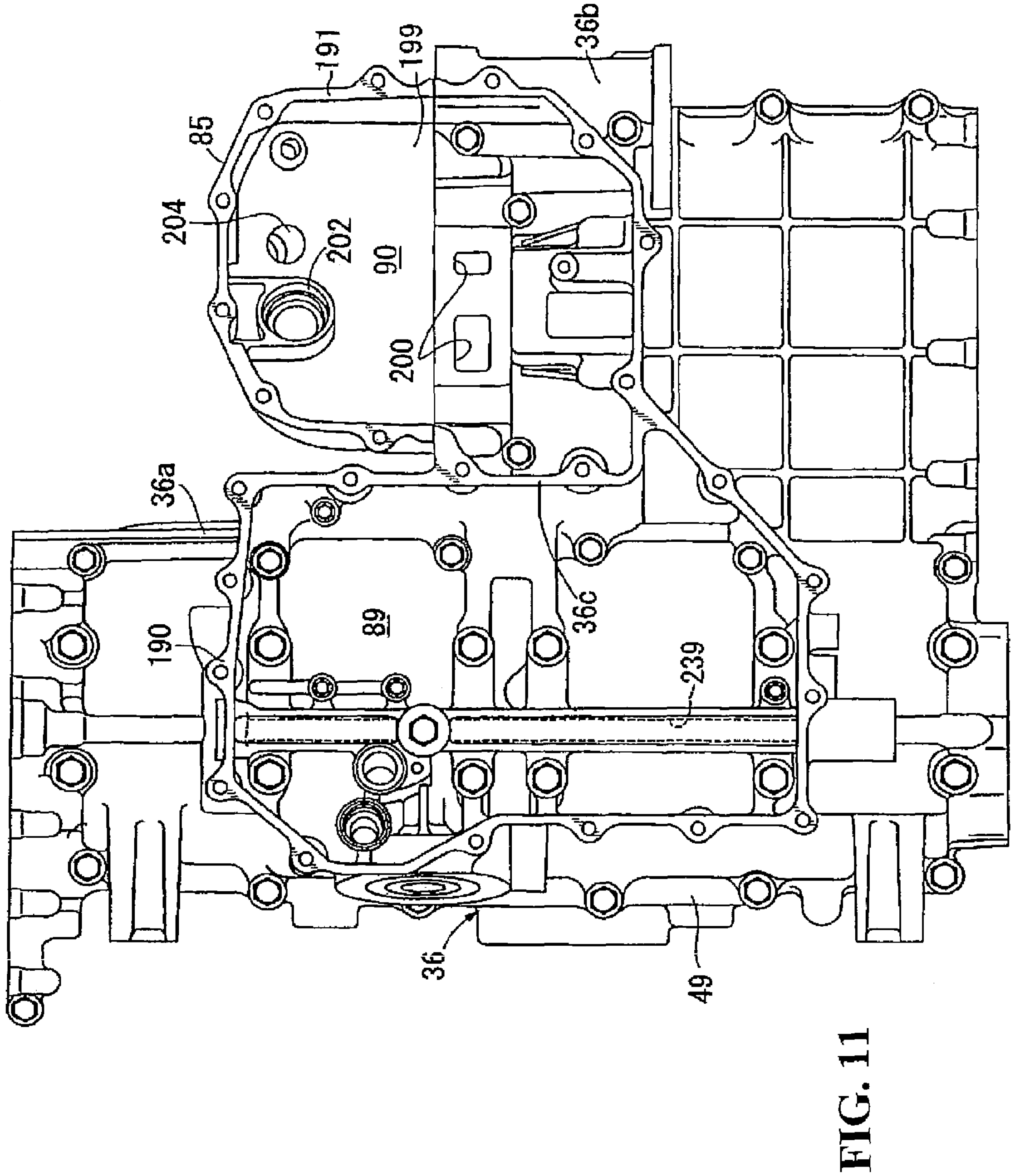
FIG. 11 illustrates the crankcase and a left cover member as viewed from the direction of arrow line 11-11 of FIG. 2.

In FIG. 11, an endlessly continuous first joint surface 190 is formed on the lower surface of the front half portion **36*a* in the lower case half body 49 of the crankcase 36 so as to correspond to the crank chamber 39. In addition, a second joint surface 191 is formed on the lower surface of the rear half portion 36*b* in the lower case half body 49 of the crankcase 36 and on the lower surface of the left cover member 85 joined to the rear half body 36*b* so as to correspond to the continuously variable transmission chamber 90 while endlessly continuing into and sharing part of the first joint surface 190 at the partition wall portion 36*c***.

Figure 12:
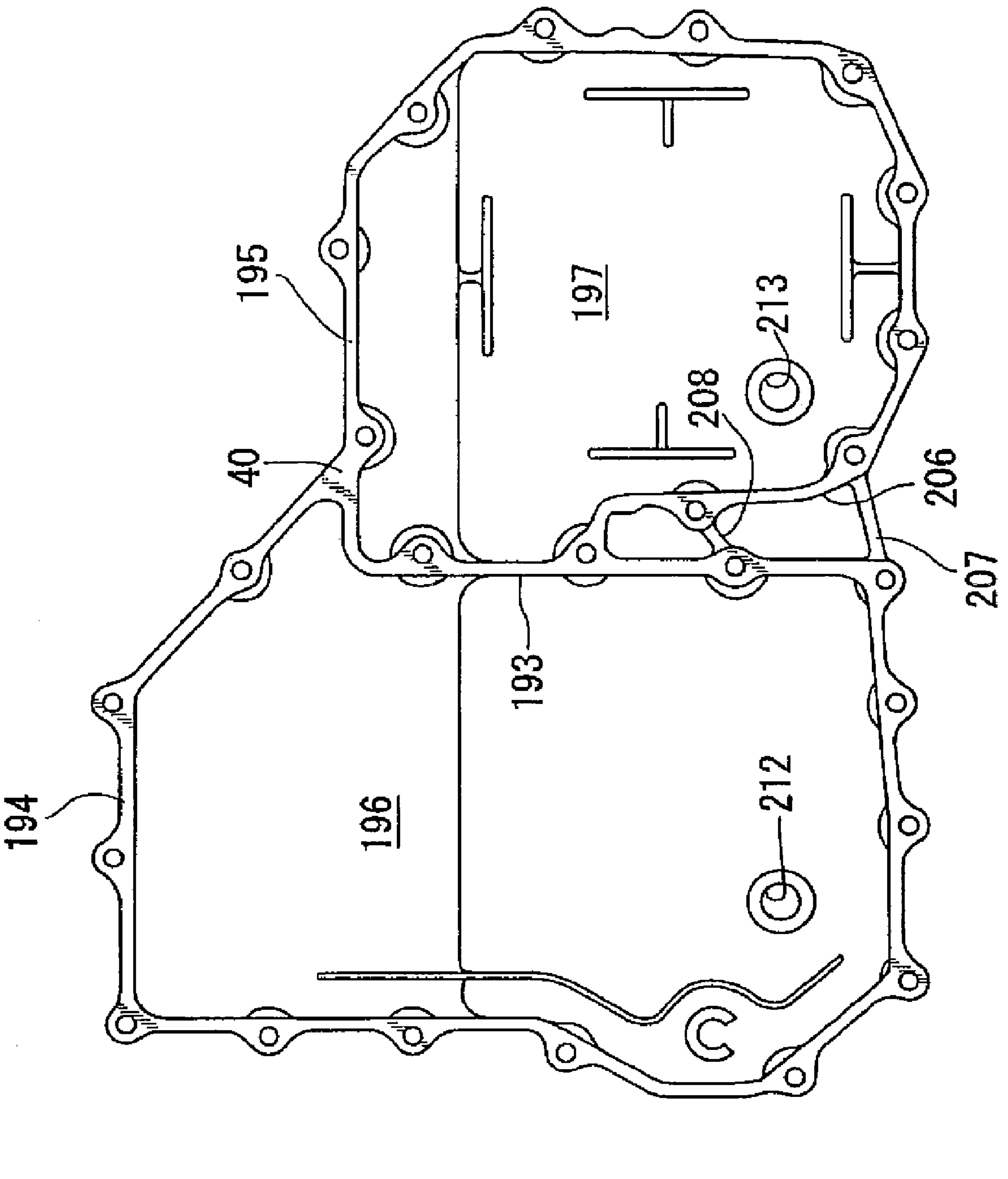
FIG. 12 illustrates an oil pan as viewed from the direction of arrow 12-12 of FIG. 2.

As illustrated in FIG. 12, the oil pan 40 is provided with a partition wall 193 adapted to separate an internal combustion engine side oil storage chamber 196 from a continuously variable transmission side oil storage chamber 197. The internal combustion engine side oil storage chamber 196 is adapted to store oil for various lubricating portions of the internal combustion engine E. The continuously variable transmission side oil storage chamber 197 is adapted to store oil for lubricating the power transmission device T including the continuously variable transmission 91, for shift-controlling the continuously variable transmission 91 and for controlling the input clutch 92 and the start clutch 93. In addition, the oil pan 40 is formed on an upper surface with an endless third joint surface 194 and a fourth joint surface 195. The third joint surface 194 is joined to the first joint surface 190 of the crankcase 36. The fourth joint surface 195 is joined to the second joint surface 191 between the crankcase 36 and the left cover member 85 while endlessly continuing into and sharing part of the third joint surface 194 at a portion corresponding to the partition wall 193.

In this way, the oil pan 40 is fastened to the crankcase 36 and to the left cover member 85 with a plurality of bolts 198 in such a manner that the third and fourth joint surfaces 194, 195 are joined to the first and second joint surfaces 190, 191. The internal combustion engine side oil storage chamber 196 is allowed to communicate with the lower portion of the crank chamber 89.

Focusing on FIG. 7, a ceiling wall portion 199 is provided on the rear half portion **36*b* of the lower case half body 49 in the crankcase 36 and on the left cover member 85 so as to be interposed between the continuously variable transmission side oil storage chamber 197 and the continuously variable transmission chamber 90 and to serve as a ceiling wall of the continuously variable transmission side oil storage chamber 197. The ceiling wall portion 199 is provided with a plurality of communication holes 200 adaptable for communication between the continuously variable transmission side oil storage chamber 197 and the continuously variable transmission chamber 90. This allows the continuously variable transmission side oil storage chamber 197 to communicate with the continuously variable transmission chamber 90**.

In addition, the continuously variable transmission side oil storage chamber 197 is defined by the lower portion of the left cover member 85, the oil pan 40 and the ceiling wall portion 199. The continuously variably transmission side oil storage chamber 197 partially protrudes from the continuously variable transmission chamber 90 outwardly in the width-direction of the motorcycle. The lower portion of the left cover member 85 and the left lateral wall of the oil pan 40 are formed to protrude outwardly from the upper portion of the left cover member 85 as clearly shown in FIG. 7.

The center C2 of the continuously variable transmission side oil storage chamber 197 with respect to the width-direction of the motorcycle is disposed to be offset leftward or rightward from the body centerline C1 on the center of the width-direction. In this embodiment, the center C2 is disposed to be offset leftward from the body centerline C1. The continuously variable transmission side oil storage chamber 197 is formed to partially protrude outwardly from the continuously variable transmission chamber 90 on the side where the continuously variable transmission side oil storage chamber 197 is offset from the body centerline C1. The continuously variable transmission 91 is disposed to be offset rightward from the body centerline C1 conversely to the continuously variable transmission side oil storage chamber 197.

Figure 13:
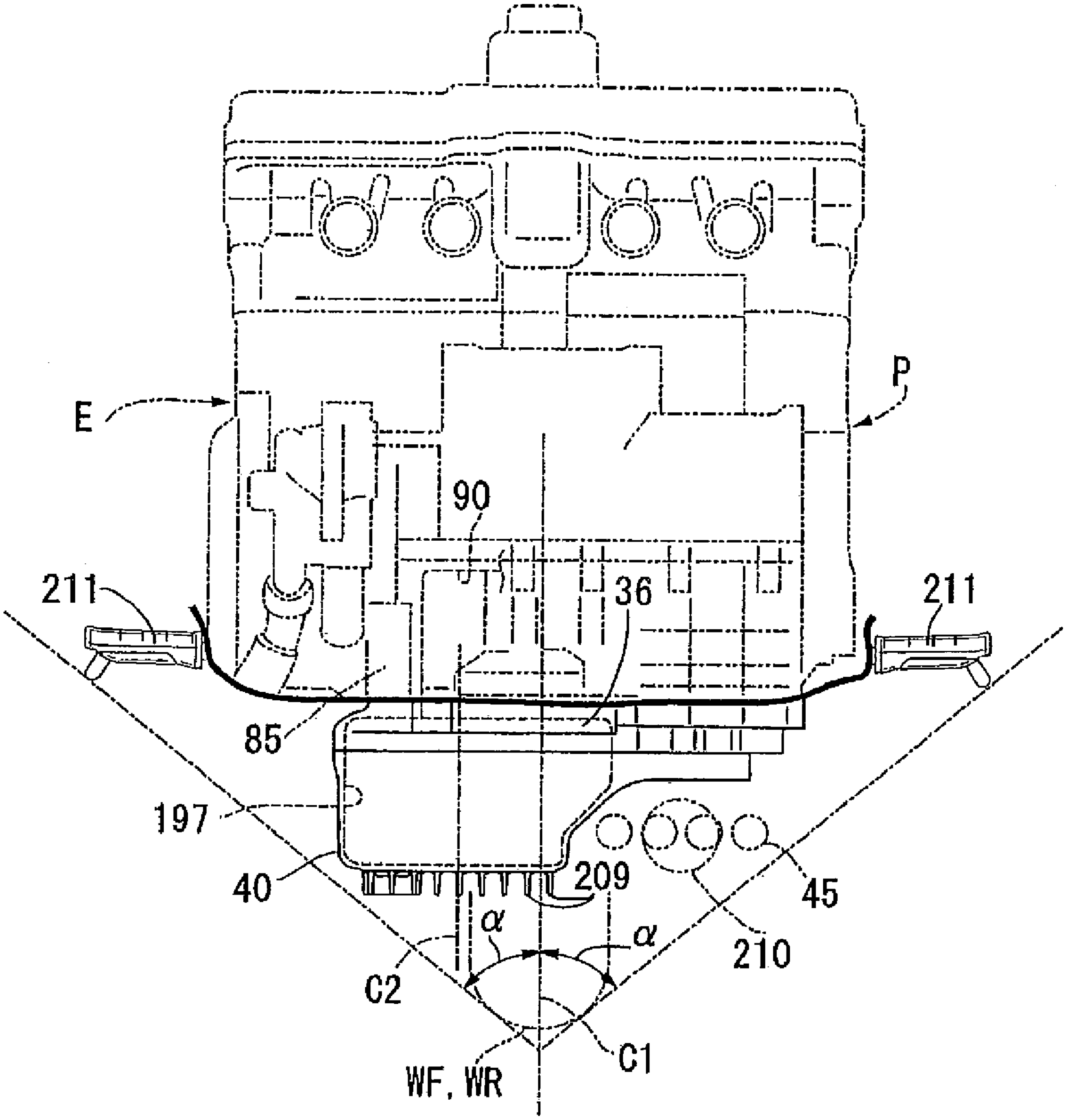
FIG. 13 is a rear view of the power unit as viewed from the rear.

As described above, the center C2 of the continuously variable transmission side oil storage chamber 197 with respect to the width-direction of the motorcycle is disposed to be offset leftward from the body centerline C1. In addition, on the offset side, the continuously variable transmission side oil storage chamber 197 protrudes outwardly from the continuously variable transmission chamber 90. Thus, as shown in FIG. 13, an empty space can be ensured on the right side from the body centerline C1 and below the crankcase 36. The four exhaust pipes 45, a collecting exhaust pipe 210 collecting the exhaust pipes 45 and the like are arranged in the space.

The body frame F or internal combustion engine E is provided with respective steps 211, 211 on both sides of the motorcycle. The bank angle α of the motorcycle is determined by both the steps 211, 211. The continuously variable transmission side oil storage chamber 197 is formed to partially protrude outwardly from the continuously variable transmission chamber 90 in a range where the oil storage chamber 197 is accommodated in the bank angle α.

The first oil pump 100 is disposed on the upper portion of the left cover member 85 serving as a wall portion constituting part of an external wall of the continuously variable transmission chamber 91 so as to be coupled to one end of the drive pulley shaft 95 constituting part of the continuously variable transmission 91. The first oil pump 100 is adapted to pump oil stored in the continuously variable transmission side oil storage chamber 197, the oil being used for lubricating the power transmission device T including the continuously variable transmission 91, for shift-controlling the continuously variable transmission 91 and for controlling the input clutch 92 and the start clutch 93. The continuously variable transmission side oil storage chamber 197 is formed to partially protrude outwardly from the wall portion on which the first oil pump 100 is mounted, i.e., from the upper portion of the left cover member 85.

An oil strainer 201 is disposed in the continuously variable transmission side oil storage chamber 197. A connection pipe 202 connected to the oil strainer 201 is provided to extend downward at a portion, on the side of the left cover member 85, of the ceiling wall portion 199 which is provided on the rear half portion **36*b* of the lower case half body 49 and on the left cover member 85 so as to serve as a ceiling wall of the continuously variable transmission side oil storage chamber 197, i.e., in a protruding portion of the continuously variable transmission side oil storage chamber 197**.

A suction oil passage 203 is provided on the outside surface of the left cover member 85 to introduce the oil of the continuously variable transmission side oil storage chamber 197 into the first oil pump 100. More specifically, the suction oil passage 203 is provided to extend vertically so as to have a lower end portion allowed to communicate with the connection pipe portion 202 disposed at a portion, of the ceiling wall of the continuously variable transmission side oil storage chamber 197, protruding outwardly of the continuously variable transmission chamber 90, and an upper portion allowed to communicate with the first oil pump 100.

A gauge hole 204 (see FIG. 11) is provided at a portion, outwardly protruding from the continuously variable transmission chamber 90, of the ceiling wall portion 199 which is a ceiling wall of the continuously variable transmission side oil storage chamber 197. The gauge hole 204 has an axis that slants to be spaced from the outer surface of the left cover member 85 as it goes upward. A level gauge 205 (see FIGS. 2 and 7) is removably attached to the gauge hole 204 in order to check the amount of the oil stored in the continuously variable transmission side oil storage chamber 197.

Figure 14:
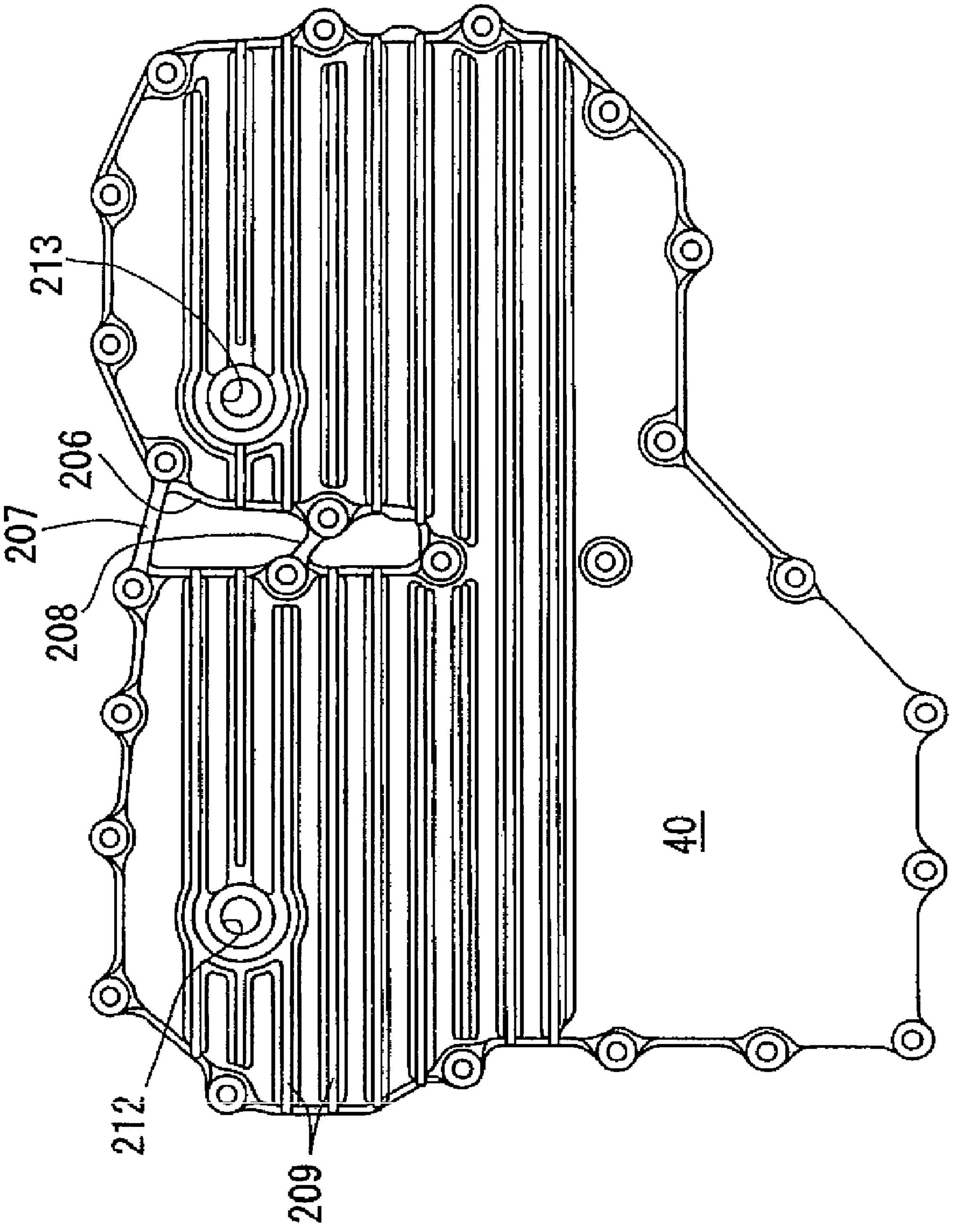
FIG. 14 illustrates the oil pan as viewed from the direction of arrow 14 of FIG. 2.

As illustrated in FIG. 14, the oil pan 40 is provided with a groove 206 corresponding to a gap between the crankcase 36 and the left cover member 85 at a portion provided with the partition wall 193. The groove 206 is provided so as to open to below and to one side (in this embodiment, the left side, i.e., the side opposite to the right side where the exhaust pipes 45 and the collecting exhaust pipe 210 are disposed). Reinforcing bridge portions 207, 208 are provided between both the lateral walls of the groove 206. A plurality of ribs 209 are provided to project from the bottom portion of the oil pan 40 and line up in the back and forth direction of the motorcycle. The oil pan 40 is provided in the bottom portion with a drain hole 212 communicating with the inner lower portion of the internal combustion engine side oil storage chamber 196 and with a drain hole 213 communicating with the inner lower portion of the continuously variable transmission side oil storage chamber 197.

Focusing on FIG. 7, oil discharged from the first oil pump 100 is directed via a discharge oil passage 214 provided in the left cover member 85 and in the crankcase 36 to a hydraulic control device 215 provided on a rear side upper lateral wall of the crankcase 36.

The hydraulic pressure controlled by the hydraulic control device 215 is supplied to the first hydraulic chamber 138 of the input shaft 92 described with reference to FIG. 8, to the second and third hydraulic chambers 149, 153 of the drive side hydraulic drive mechanism 148 described with reference to FIG. 9, and to the fourth hydraulic chamber 162 of the driven side hydraulic drive mechanism 160 and the fifth hydraulic chamber 176 of the start clutch 93 both described with reference to FIG. 7.

Focusing on FIGS. 7 to 9, the drive pulley shaft 95 is coaxially provided with a first central oil passage 216 bottomed and opening toward the third right cover member 88. A cylindrical first tubular member 217 is liquid-tightly and coaxially inserted into the first central oil passage 216 so as to communicate with the third oil hole 157. An oil passage 218 communicating with the first tubular member 217 is provided in the third right cover member 88 so as to lead hydraulic pressure from the hydraulic control device 215 thereto. A cylindrical second tubular member 219 is coaxially inserted into the first central oil passage 216 so as to coaxially surround the first tubular member 217. The second tubular member 219 is adapted to define, between the first and second tubular members 217, 218, an annular passage 220 (see FIG. 8) communicating with the first oil hole 140 continuous to the first hydraulic chamber 138 of the input clutch 92. An electromagnetic valve 221 (see FIGS. 3 and 7) is mounted to the third right cover member 88 to switch the application and release of the hydraulic pressure discharged from the first oil pump 100 to the annular passage 220.

Focusing on FIG. 7, a second central oil passage 223 bottomed and opening toward the third right cover member 88 and a clutch control oil passage 224 bottomed and opening toward the left cover member 85 are coaxially provided in the driven pulley shaft 96 so as to be axially spaced apart from each other. A cylindrical third tubular member 225 is coaxially inserted into the second central oil passage 223 from the side of the third right cover member 88 to form a lubricating oil passage 222 adapted to direct lubricating oil to the driven pulley 98. An oil passage 226 communicating with the third cylinder member 225 is provided in the second right cover member 87 so as to direct oil from the first oil pump 100. In addition, as shown in FIG. 10, a branch oil passage 181 branching from the lubricating oil passage 222 is provided in the driven pulley shaft 96 so as to extend on the lateral side of the clutch control oil passage 224 and communicate with the canceller chamber 179 of the start clutch 93.

A cylindrical fourth tubular member 227 is coaxially inserted into the second central oil passage 223 to coaxially surround the third tubular member 225. The fourth tubular member 227 is adapted to define an annular oil passage 228 between the third tubular member 225 and the fourth tubular member 227 so as to communicate with the fourth hydraulic chamber 162 of the driven side hydraulic drive mechanism 160 via the fourth oil hole 165. A connection pipe 229 is provided between the second right cover member 87 and the third cover member 88 so as to allow the annular oil passage 228 to communicate with the oil passage 218 of the third right cover member 88.

Focusing on FIG. 10, a cylindrical fifth tubular member 230 is coaxially inserted into the clutch control oil passage 224 from the side of the left cover member 85 so as to communicate with the fifth oil hole 178 continuous with the fifth hydraulic chamber 176 of the start clutch 93. The left cover member 85 is provided with an oil passage 231 communicating with the fifth tubular member 230 is provided in the left cover member 85 so as to lead hydraulic pressure from the hydraulic control device 215 thereto.

As shown in FIG. 5, an oil trainer 232 is installed in the internal combustion engine side oil storage chamber 196 of the oil pan 40. A second oil pump 234 (see FIG. 3) for pumping oil from the internal combustion engine side oil storage chamber 196 via the oil strainer 232 is used to supply lubricating oil to the lubricating portions of the internal combustion engine E. An endless chain 237 is wound around a drive sprocket 235 provided on the crankshaft 50 and around a driven sprocket 236 on the side of the second oil pump 234. The second oil pump 234 is driven by power transmitted from the crankshaft 50.

Oil to be discharged from the second oil pump 234 is purified by an oil filter 238 attached to the front lateral wall of the crankcase 36 and then supplied toward a main gallery 239 provided on the crankcase 36.

A description is next made of the functions of the embodiment. The oil pan 40 joined to the crankcase 36 is internally partitioned into the internal combustion engine side oil storage chamber 196 and the continuously variable transmission side oil storage chamber 197. In addition, the continuously variable transmission chamber 90 liquid-tightly isolated from the crank chamber 89 is allowed to communicate with the continuously variable transmission side oil storage chamber 197. Thus, it is avoided to use a plurality of the oil pans 40 while using respective different oils for the side of the internal combustion engine E and for the side of the continuously variable transmission 91. This can suppress an increase in the number of component parts, which can avoid an increase in the weight of the motorcycle, contributing to an improvement in the kinematic performance of the motorcycle.

The partition wall 193 provided in the oil pan 40 can increase the rigidity of the oil pan 40 which tends to increase in size to ensure the amount of oil for the internal combustion engine E and for the continuously variable transmission 91.

The continuously variable transmission side oil storage chamber 197 is formed to partially protrude outwardly from the continuously variable transmission chamber 90 in the width-direction of the motorcycle. If the oil pan 40 is downwardly enlarged to sufficiently ensure the amount of oil, an influence is exerted on the minimum ground clearance of the motorcycle. However, it is possible to prevent the lowering of the minimum ground clearance while sufficiently ensuring the capacity of the oil pan 40. Thus, it is possible to efficiently arrange the oil pan 40 in the limited space of the motorcycle.

The center C2 of the continuously variable transmission side oil storage chamber 197 with respect to the width-direction of the motorcycle is disposed to be offset leftward or rightward (leftward in this embodiment) from the body centerline C1. In addition, the continuously variable transmission side oil storage chamber 197 protrudes outwardly from the continuously variable transmission chamber 90 on the side where the continuously variable transmission side oil storage chamber 197 is offset from the body centerline C1. The empty space can be ensured on the right or left side (the right side in this embodiment) from the body centerline C1 and below the crankcase 36. The four exhaust pipes 45, 210 and the like can be arranged in the space. Thus, if the oil pan 40 is enlarged in the width-direction of the motorcycle to ensure the capacity, it is possible to prevent the exhaust pipes 45, 210 and the like from outwardly protruding due to the enlargement of the oil pan 40.

The drive pulley shaft 95 is coupled at one end to the first oil pump 100 mounted to the left cover member 85 which is a wall portion, on one end side of the drive pulley shaft 95, of the outer wall of the continuously variable transmission chamber 90. The continuously variable transmission side oil storage chamber 197 is formed to protrude outwardly from the upper portion of the left cover member 85 on which the first oil pump 100 is mounted. Thus, the oil pump 100 and the drive pulley 97 can share the shaft to reduce the number of component parts. The oil pump 100 is disposed on the shaft end of the drive pulley shaft 95 and on the wall portion to facilitate assembly. Further, since the oil pump 100 is within the width of the continuously variable transmission side oil storage chamber 197, a line connecting the continuously variable transmission side oil storage chamber 197 with the oil pump 100 can linearly be simplified to facilitate the formation of the intake oil passage 203.

The continuously variable transmission side oil storage chamber 197 is formed to protrude outwardly from the continuously variable transmission chamber 90 in the range of the bank angle α determined by the steps 211 disposed on both the sides of the motorcycle. Thus, the partially protruding formation of the continuously variable transmission side oil storage chamber 197 has no influence on the bank angle α.

The center C2 of the continuously variable transmission side oil storage chamber 197 with respect to the width-direction is disposed to be offset to one side from the body centerline C1. The continuously variable transmission 91 is disposed at a position offset to the other side from the body centerline C1. Thus, it can be avoided that heavy loads are arranged to be offset to one side of the motorcycle with respect to the width-direction thereof.

The gauge hole 204 is provided at a portion, outwardly protruding from the continuously variable transmission chamber 90, of the ceiling wall portion 199 of the continuously variable transmission side oil storage chamber 197 so as to receive the level gauge 205 removably inserted thereinto, the level gauge 205 being used to check the amount of the oil stored in the continuously variable transmission side oil storage chamber 197. Thus, during the inserting or removing work of the level gauge 205, the left cover member 85 which is a wall portion of the continuously variable transmission chamber 90 does not hinder such work, that is, the inserting or removing work of the level gauge 205 can be facilitated. In addition, also when the gauge hole 205 is used to feed oil into the continuously variable transmission chamber 197, such operation can be facilitated similarly.

The intake oil passage 203 adapted to lead the oil of the continuously variable transmission side oil storage chamber 197 to the first oil pump is provided on the external lateral surface of the left cover member 85 so as to extend from a portion, externally protruding from the continuously variable transmission chamber 90, of the continuously variable transmission side oil storage chamber 197 to the oil pump 100. Thus, it is eliminated to form, in the crankcase 36, an intake oil passage connecting the continuously variable transmission side oil storage chamber 197 with the first oil pump 100. This facilitates the formation of the intake oil passage 203 and makes it possible to avoid lowering the flexibility of arranging component parts in the crankcase 36.

Further, the oil pan 40 is provided with the groove 206 opening below and to one side (in this embodiment, the left side, i.e., the side opposite to the right side where the exhaust pipes 45 and the collecting exhaust pipe 210 are disposed). Therefore, the surface area of the oil pan 40 is increased to enhance cooling performance. In addition, since the groove 206 is provided to correspond to the partition wall 193 isolating the internal combustion side oil storage chamber 196 from the continuously variable transmission side oil storage chamber 197, cooling air can be applied to almost the entire circumference of the outer wall of both the oil storage chambers 196, 197, thereby providing a more excellent cooling effect.

The clutch control oil passage 224 adapted to lead working oil to the start clutch 93 and the lubricating oil passage 222 adapted to lead lubricating oil to the driven pulley 98 of the continuously variable transmission 91 are coaxially provided on the driven pulley shaft 96 including the start clutch 94 so as to be axially isolated from each other. Thus, compared with the case where the clutch control oil passage is provided to coaxially surround the lubricating oil passage or vice versa, characteristically, complication of the oil passage configuration can be suppressed and an increase in the diameter of the driven pulley shaft 96 can be avoided.

The driven pulley shaft 96 is provided with the branch oil passage 181 branching from the lubricating oil passage 222 and extending laterally of the clutch control oil passage 224 so as to lead lubricating oil to the canceller chamber 179 of the start clutch 93. Thus, the lubricating oil from the lubricating oil passage 222 axially isolated from the clutch control oil passage 224 can be led toward the canceller chamber 179 of the start clutch 93.

Although the embodiment of the present invention has been described thus far, the invention is not limited to the embodiment. Various design modifications can be made without departing from the invention recited in the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a motorcycle, comprising:

an internal combustion engine; and a power transmission device including:

a continuously variable transmission having a drive pulley provided on a drive pulley shaft adapted to receive rotational power transmitted thereto from the engine, a driven pulley provided on a driven pulley shaft having an axis parallel to the drive pulley shaft, and a belt wound around the drive pulley and around the driven pulley; and a hydraulically-operated clutch provided on the driven pulley shaft;

wherein a clutch control oil passage adapted to direct working oil to the clutch and a lubricating oil passage adapted to direct lubricating oil to the continuously variable transmission are provided in the driven pulley shaft so as to be coaxial with each other and axially isolated from each other.

2. The power unit for the motorcycle according to claim 1, wherein a branch oil passage branching from the lubricating oil passage and extending laterally of the clutch control oil passage is provided in the driven pulley shaft to lead lubricating oil to a canceller chamber of the clutch.

3. The power unit for the motorcycle according to claim 1, and further including an input clutch operatively connected to the drive pulley shaft and a first hydraulic chamber wherein a predetermined increase in pressure within said first hydraulic chamber actuates the input clutch for transmitting power from the drive pulley shaft to a input clutch inner and a predetermined decrease in pressure within said first hydraulic chamber deactuates the transmission of power from the drive pulley shaft to the input clutch inner.

4. The power unit for the motorcycle according to claim 3, wherein the drive pulley includes a drive side stationary pulley half body and a drive side movable pulley half body, said stationary pulley half body includes a tubular cylinder-shaft portion integrally formed with the stationary pulley half body and extending a predetermined distance therefrom, said tubular cylinder-shaft portion coaxially surrounding the drive pulley shaft and being mounted relative thereto for relative rotation.

5. The power unit for the motorcycle according to claim 4, wherein the movable pulley half body is mounted on the cylinder-shaft portion for relative axial sliding motion and is incapable of relative rotation.

6. The power unit for the motorcycle according to claim 1, wherein the driven pulley includes a driven side stationary pulley half body integrally provided on the driven pulley shaft and a driven side movable half body mounted on the driven pulley shaft for relative axial sliding motion and is incapable of relative rotation.

7. The power unit for the motorcycle according to claim 1, wherein the belt is wound around the drive pulley and the driven pulley wherein relative axial positions of a drive side movable pulley half body relative to a drive side stationary pulley half body and a driven side movable pulley half body relative to a driven side stationary pulley half body are hydraulically controlled in a stepless manner.

8. The power unit for the motorcycle according to claim 1, wherein the hydraulically-operated clutch includes a piston with an inner circumferential portion in slidable contact with an outer circumferential portion of a boss member in a liquid-tight manner, and said piston includes an outer circumferential portion in slidable contact with a clutch outer in a liquid-tight manner, said driven pulley shaft includes an oil hole in communication with a hydraulic chamber, wherein a predetermined increase in the pressure within said hydraulic chamber actuates the hydraulically-operated clutch and a predetermined decrease in pressure within said hydraulic chamber deactuates the hydraulically-operated clutch.

9. The power unit for the motorcycle according to claim 8, wherein a wall member is secured at an inner circumferential portion of the boss member to define a canceller chamber between the piston and the wall member, said piston being in slidable contact with an outer circumferential portion of the wall member in a liquid-tight manner.

10. The power unit for the motorcycle according to claim 9, and further including a biasing member operatively positioned within said canceller chamber and interposed between the piston and the wall member, said driven pulley shaft and the boss member being provided with a branch oil passage for directing lubricating oil to the canceller chamber.

11. A power unit for a motorcycle, comprising:

an internal combustion engine; and a power transmission device including:

a continuously variable transmission having a drive pulley provided on a drive pulley shaft adapted to receive rotational power transmitted thereto from the engine, a driven pulley provided on a driven pulley shaft having an axis parallel to the drive pulley shaft, and a belt wound around the drive pulley and around the driven pulley; and a hydraulically-operated clutch provided on the drive pulley shaft;

wherein a clutch control oil passage adapted to direct working oil to the clutch and a lubricating oil passage adapted to direct lubricating oil to the continuously variable transmission are provided in the drive pulley shaft so as to be coaxial with each other and axially isolated from each other.

12. The power unit for the motorcycle according to claim 11, wherein a branch oil passage branching from the lubricating oil passage and extending laterally of the clutch control oil passage is provided in the driven pulley shaft to lead lubricating oil to a canceller chamber of the clutch.

13. The power unit for the motorcycle according to claim 11, and further including an input clutch operatively connected to the drive pulley shaft and a first hydraulic chamber wherein a predetermined increase in pressure within said first hydraulic chamber actuates the input clutch for transmitting power from the drive pulley shaft to a input clutch inner and a predetermined decrease in pressure within said first hydraulic chamber deactuates the transmission of power from the drive pulley shaft to the input clutch inner.

14. The power unit for the motorcycle according to claim 13, wherein the drive pulley includes a drive side stationary pulley half body and a drive side movable pulley half body, said stationary pulley half body includes a tubular cylinder-shaft portion integrally formed with the stationary pulley half body and extending a predetermined distance therefrom, said tubular cylinder-shaft portion coaxially surrounding the drive pulley shaft and being mounted relative thereto for relative rotation.

15. The power unit for the motorcycle according to claim 14, wherein the movable pulley half body is mounted on the cylinder-shaft portion for relative axial sliding motion and is incapable of relative rotation.

16. The power unit for the motorcycle according to claim 11, wherein the driven pulley includes a driven side stationary pulley half body integrally provided on the driven pulley shaft and a driven side movable half body mounted on the driven pulley shaft for relative axial sliding motion and is incapable of relative rotation.

17. The power unit for the motorcycle according to claim 11, wherein the belt is wound around the drive pulley and the driven pulley wherein relative axial positions of a drive side movable pulley half body relative to a drive side stationary pulley half body and a driven side movable pulley half body relative to a driven side stationary pulley half body are hydraulically controlled in a stepless manner.

18. The power unit for the motorcycle according to claim 11, wherein the hydraulically-operated clutch includes a piston with an inner circumferential portion in slidable contact with an outer circumferential portion of a boss member in a liquid-tight manner, and said piston includes an outer circumferential portion in slidable contact with a clutch outer in a liquid-tight manner, said driven pulley shaft includes an oil hole in communication with a hydraulic chamber, wherein a predetermined increase in the pressure within said hydraulic chamber actuates the hydraulically-operated clutch and a predetermined decrease in pressure within said hydraulic chamber deactuates the hydraulically-operated clutch.

19. The power unit for the motorcycle according to claim 18, wherein a wall member is secured at an inner circumferential portion of the boss member to define a canceller chamber between the piston and the wall member, said piston being in slidable contact with an outer circumferential portion of the wall member in a liquid-tight manner.

20. The power unit for the motorcycle according to claim 19, and further including a biasing member operatively positioned within said canceller chamber and interposed between the piston and the wall member, said driven pulley shaft and the boss member being provided with a branch oil passage for directing lubricating oil to the canceller chamber.

* * * * *